(12) United States Patent
Mulet et al.

(10) Patent No.: US 11,471,857 B2
(45) Date of Patent: Oct. 18, 2022

(54) METAL ORGANIC FRAMEWORK BASED WATER CAPTURE APPARATUS

(71) Applicant: Commonwealth Scientific and Industrial Research Organisation, Acton (AU)

(72) Inventors: Xavier Mulet, Acton (AU); Kristina Konstas, Acton (AU); Aaron Thornton, Acton (AU); Matthias Hesselmann, Acton (AU); Stefan Herrmann, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 274 days.

(21) Appl. No.: 16/881,281

(22) Filed: May 22, 2020

(65) Prior Publication Data
US 2020/0282379 A1 Sep. 10, 2020

Related U.S. Application Data

(63) Continuation of application No. PCT/AU2019/050860, filed on Aug. 16, 2019.

(30) Foreign Application Priority Data

Aug. 16, 2018 (AU) ................. 2018903009

(51) Int. Cl.
*B01D 53/26* (2006.01)
*B01J 20/22* (2006.01)
(Continued)

(52) U.S. Cl.
CPC ........ *B01J 20/226* (2013.01); *B01D 53/0423* (2013.01); *B01D 53/0438* (2013.01);
(Continued)

(58) Field of Classification Search
CPC ................ B01D 53/04; B01D 53/0423; B01D 53/0438; B01D 53/047; B01D 53/261;
(Continued)

(56) References Cited

U.S. PATENT DOCUMENTS 3,734,293 A 5/1973 Biskis
2015/0266010 A1* 9/2015 Bazer-Bachi ........ B01J 31/2295
264/234

(Continued)

FOREIGN PATENT DOCUMENTS

| CN | 106732385 A | 5/2017 |
| CN | 108031438 A | 5/2018 |

(Continued)

OTHER PUBLICATIONS

Extended European Search Report for European Patent Application No. 20174626.0 dated Sep. 9, 2020, 7 pages.
(Continued)

*Primary Examiner* — Frank M Lawrence, Jr.
(74) *Attorney, Agent, or Firm* — Merchant & Gould P.C.

(57) ABSTRACT

An apparatus for capturing a water content from a water containing gas, the apparatus comprising: a housing having an inlet into which the water containing gas can flow; a water adsorbent enclosed within the housing, the water adsorbent comprising at least one water adsorbent metal organic framework composite capable of adsorbing a water content from the water containing gas, the metal organic framework composite comprising: at least 50 wt % water adsorbent metal organic framework; from 0.2 to 10 wt % magnetic particles having a mean particle diameter of less than 200 nm; and at least 0.1 wt % hydrophilic binder comprising a hydrophilic cellulose derivative; and a water desorption arrangement in contact with and/or surrounding the water adsorbent, the water desorption arrangement com-
(Continued)

prising an alternating current (AC) magnetic field generator located within and/or around the water adsorbent configured to apply an AC magnetic field to the water adsorbent.

20 Claims, 15 Drawing Sheets

(51) Int. Cl.
| | |
|---|---|
| B01J 20/28 | (2006.01) |
| B01D 53/04 | (2006.01) |
| B01J 20/06 | (2006.01) |
| B01J 20/24 | (2006.01) |
| B01J 20/34 | (2006.01) |
| E03B 3/28 | (2006.01) |
| F24F 3/14 | (2006.01) |

(52) U.S. Cl.
CPC ............ *B01D 53/261* (2013.01); *B01J 20/06* (2013.01); *B01J 20/24* (2013.01); *B01J 20/2803* (2013.01); *B01J 20/28004* (2013.01); *B01J 20/28009* (2013.01); *B01J 20/28011* (2013.01); *B01J 20/3425* (2013.01); *B01J 20/3433* (2013.01); *B01J 20/3441* (2013.01); *B01J 20/3483* (2013.01); *E03B 3/28* (2013.01); *F24F 3/1411* (2013.01); *B01D 2253/204* (2013.01); *B01D 2253/304* (2013.01); *B01D 2257/80* (2013.01); *B01D 2259/40088* (2013.01); *B01D 2259/814* (2013.01); *F24F 2003/1458* (2013.01); *F25B 2321/02* (2013.01)

(58) Field of Classification Search
CPC ........ B01D 2253/204; B01D 2253/304; B01D 2257/80; B01D 2258/06; B01D 2259/40088; B01D 2259/814; B01J 20/06; B01J 20/103; B01J 20/226; B01J 20/24; B01J 20/28004; B01J 20/28007; B01J 20/28009; B01J 20/28011; B01J 20/2803; B01J 20/28042; B01J 20/3425; B01J 20/3433; B01J 20/3441; B01J 20/3483; B01J 2220/66; E03B 3/28; F24F 2003/1458; F24F 3/1411; F25B 2321/02
USPC .......... 96/1, 108, 143, 146; 95/28, 117, 121, 95/126

See application file for complete search history.

(56) References Cited

U.S. PATENT DOCUMENTS

| | | | |
|---|---|---|---|
| 2016/0332138 | A1 | 11/2016 | Mora Vallejo et al. |
| 2018/0001296 | A1* | 1/2018 | Holbrook ............... B01J 20/103 |
| 2018/0261882 | A1 | 9/2018 | Chang et al. |
| 2018/0264437 | A1 | 9/2018 | Le Bot et al. |
| 2019/0046916 | A1* | 2/2019 | Safir ..................... B01D 53/02 |
| 2020/0363078 | A1* | 11/2020 | Mulet ................... B01J 20/3483 |
| 2021/0299607 | A1* | 9/2021 | Xia ......................... B01D 53/28 |

FOREIGN PATENT DOCUMENTS

| | | |
|---|---|---|
| EP | 2 848 303 B1 | 1/2017 |
| EP | 3 325 130 A1 | 5/2018 |
| JP | 2012-093083 A | 5/2012 |
| KR | 10-2017-0114382 A | 10/2017 |
| KR | 2017-0114382 A | 10/2017 |
| WO | 2014/118074 A1 | 8/2014 |
| WO | 2016/092176 A1 | 6/2016 |
| WO | 2017/048096 A1 | 3/2017 |
| WO | 2017/060856 A1 | 4/2017 |
| WO | 2017/061726 A1 | 4/2017 |
| WO | 2017/205752 A1 | 11/2017 |
| WO | 2018/036997 A1 | 3/2018 |
| WO | 2018/118377 A1 | 6/2018 |
| WO | 2019/010102 A1 | 1/2019 |

OTHER PUBLICATIONS

Bozbiyik, B. et al., "Stepped water isotherm and breakthrough curves on aluminium fumarate metal-organic framework: experimental and modelling study", Adsorption, 23(1): 185-192 (2016).
Extended European Search Report for European Patent Application No. 19850622.2 dated Nov. 26, 2021, 10 pages.
European Office Action for corresponding European Patent Application No. 20174626.0 dated Dec. 11, 2020, 8 pages.
International Search Report and Written Opinion of the International Searching Authority for International Patent Application No. PCT/AU2019/050860 dated Nov. 7, 2019, 9 pages.
International-type Search for Australian Provisional Patent Application No. 2018903009 dated Nov. 30, 2018, 24 pages.
Fathieh, F. et al., "Practical water production from desert air", Science Advances, 4:1-9 (2018).
Furukawa, H. et al., "Water Adsorption in Porous Metal-Organic Frameworks and Related Materials", Journal of the American Chemical Society, 136: 4369-4381 (2014).
Karmakar, S. et al., "Aluminium fumarate metal-organic framework: A super adsorbent for fluoride from water", Journal of Hazardous Materials, 303: 10-20 (2016).
Li, H. et al., "Magnetic Metal-Organic Frameworks for Efficient Carbon Dioxide Capture and Remote Trigger Release", Advanced Materials, 28: 1839-1844 (2016).
Li, H. et al., "Magnetic Induction Framework Synthesis: A General Route to the Controlled Growth of Metal-Organic Frameworks", Chemistry of Materials, 29: 6186-6190 (2017).
Rubio-Martinez, M. et al., "New synthetic routes towards MOF production at scale", Chem. Soc. Rev., 46 (3453-3480 (2017).
Sadiq, M. et al., "Magnetic Induction Swing Adsorption: An Energy Efficient Route to Porous Adsorbent Regeneration", Chemistry of Materials, 28: 6219-6226 (2016).
Sadiq, M. et al., "Magnetic Framework Composites for Low Concentration Methane Capture", Ind. Eng. Chem. Res., 57: 6040-6047 (2018).
Teo, H. et al., "Experimental study of isotherms and kinetics for adsorption of water on Aluminium Fumarate", International Journal of Heat and Mass Transfer, 114: 621-627 (2017).
Teo, H. et al., "Water Adsorption on Various Metal Organic Framework", IOP Conference Series: Materials Science and Engineering, 272: 1-5 (2017).
Yaghi, O. et al., "Water harvesting from air with metal-organic frameworks powered by natural sunlight", Science, 430-434 (2017).
Yaghi, O. et al., "Adsorption-based atmospheric water harvesting device for arid climates", Nature Communications, 9: 1-8(2018).
Office Action for European Patent Application No. 19850622.2 dated Mar. 22, 2022, 7 pages.
Noorporr, Z. et al., "High capacity and energy-efficient dehydration of liquid fuel 2-dimethyl amino ethyl azide (DMAZ) over chromium terephthalic (MIL-101) nanoadsorbent", Adsorption, 23: 743-752 (2017).

* cited by examiner

METAL ORGANIC FRAMEWORK BASED WATER CAPTURE APPARATUS

PRIORITY CROSS-REFERENCE

The present application is a Continuation of International Patent Application No. PCT/AU2019/050860 filed on 16 Aug. 2019, which claims convention priority from Australian provisional patent application No. 2018903009 filed 16 Aug. 2018, the contents of which should be understood to be incorporated herein by this reference. To the extent appropriate, a claim of priority is made to each of the above disclosed applications.

TECHNICAL FIELD

The present invention generally relates to an apparatus, a method and a system that utilises a water adsorbent metal organic framework composite to capture the water content of a water containing gas, such as atmospheric air. In one form, the invention is configured for temperature swing water harvesting and in particular magnetic induction swing water harvesting using Magnetic Framework Composites (MFC)—a composite material formed between a metal organic framework and a magnetic material. However, it should be appreciated that the present invention could be used in other water harvesting applications that utilise a water adsorbent metal organic framework composite material.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Water can be a scare resource in many parts of the world, particularly in dry or arid environments. However, water vapour and droplets in the atmosphere is a natural resource that could be captured to increase the global supply of water.

Various atmospheric water capturing systems have been previously developed which contain an adsorbent material that can capture and release water, for example by heating the adsorbent material using solar or other external means.

One type of adsorption material capable of adsorbing water vapour is Metal-Organic Frameworks (MOFs). A number of MOFs are known that are able to adsorb moisture. These known MOF adsorbents physisorb water onto the surfaces within the pores of the MOF.

Although MOFs have already been considered in numerous applications, including gas storage, separation, and dehumidification, the use of MOFs for water capturing has only recently been proposed.

One example of MOF based water capture is taught in Yaghi et al. "Water harvesting from air with metal-organic frameworks powered by natural sunlight." *Science* 356.6336 (2017): 430-434 (Yaghi 1), and in a subsequent publication (which provides further details of the system) Yaghi et al. "Adsorption-based atmospheric water harvesting device for arid climates." *Nature communications* 9.1 (2018): 1191 (Yaghi 2). The system described in both papers utilised a porous metal-organic framework (microcrystalline powder MOF-801, $[Zr_6O_4(OH)_4(fumarate)_6]$) to capture water by vapour adsorption in ambient air with low Relative Humidity (RH) (down to RH of 20% at 35° C.). The MOF-801 powder was infiltrated into a porous copper foam brazed on a copper substrate, to create an adsorbent layer with 1.79 g of activated MOF-801 with an average packing porosity of ~0.85. The copper foam geometry was selected to have a high substrate area to thickness ratio to reduce parasitic heat loss. Water was released from the MOF using a non-concentrated solar flux below 1 sun (1 kW m$^{-2}$), requiring no additional power input for producing water at ambient temperature outdoors. In Yaghi 1, condensation was driven using a condenser interfaced with a thermoelectric cooler (using the cooling side of the thermoelectric "peltier" device only) to maintain the isobaric conditions of ~1.2 kPa (20% RH at 35° C., saturation temperature of ~10° C.) in order to condense all of the water in the desorbed vapour. This thermoelectric cooler appears to have not been utilised in Yaghi 2. The device was reported in Yaghi 2 to capture and deliver water at 0.25 L kg/MOF/day at 20% RH and 35° C. It is noted that Yaghi 2 appears to provide corrected water production results over those published in Yaghi 1.

Despite the promising results taught in Yaghi 1 and Yaghi 2, the use of MOF infiltrated into a conductive substrate can still have a low energy conversion efficiency, particularly in the desorption phase using direct solar heating, thereby limiting the amount of possible water production using this system. For example, Yaghi 2 reports energy efficiencies reaching 60% at the gram scale. Significant thermal loss in this system is to be expected due to the energy required to heat the thermal mass of the copper foam substrate.

The limitations of Yaghi 1 and Yaghi 2 demonstrate that there are still opportunities to refine selection and further optimise the use of MOF adsorbents to capture atmospheric water. It would therefore be desirable to provide an improved or alternate water capture method and system which utilises MOFs to adsorb and thus capture water from a water containing gas such as atmospheric air.

SUMMARY OF THE INVENTION

The present invention provides an improved and/or alternate MOF based adsorption apparatus for capturing water from a water containing gas, such as air, for both commercial and domestic applications.

Water Harvesting Apparatus

A first aspect of the present invention provides an apparatus for capturing a water content from a water containing gas. The apparatus comprises:

a housing having an inlet into which the water containing gas (having a water content) can flow;

a water adsorbent enclosed within the housing (i.e. located inside the housing), the water adsorbent comprising at least one water adsorbent metal organic framework composite capable of adsorbing a water content from the water containing gas, the metal organic framework composite comprising: at least 50 wt % water adsorbent metal organic framework; from 0.2 to 10 wt % magnetic particles having a mean particle diameter of less than 200 nm; and at least 0.1 wt % hydrophilic binder comprising a hydrophilic cellulose derivative; and a water desorption arrangement in contact with and/or surrounding the water adsorbent, the water desorption arrangement being selectively operable between (i) a deactivated state, and (ii) an activated state in which the arrangement is configured to apply heat to the water adsorbent to desorb a water content from the water adsorbent, wherein the water desorption arrangement comprises an alternating current (AC) magnetic field generator located within and/or around the water adsorbent configured to apply an AC magnetic field to the water adsorbent.

The present invention provides an apparatus capable of harvesting water from a water containing gas, for example ambient air, which includes a MOF based composite water adsorbent that can be used to adsorb a water content when the water desorption arrangement is in a deactivated state and then selectively operated to desorb water from the water adsorbent by activating the water desorption arrangement (operating it in the activated state). It should be understood that "selectively operable" means that a user is able to actively change the condition of the water desorption arrangement from between the deactivated state and activated state, for example switch or trigger that change of state. This active change may be through the supply of a driving force to the water desorption arrangement to switch/operate the device in the activated state. Removal of the driving force would change the water desorption arrangement to the deactivated state.

The apparatus is therefore configured to enable selective operation and control of the adsorbing and desorbing phases of a water harvesting cycle of the water adsorbent. This selective operation advantageously enables the optimisation of the efficiency of water desorption arrangement through the use of more efficient water desorption arrangements to desorb water from the metal organic framework based water adsorbent compared for example to utilising solar energy. In some embodiments, this selective operation can also achieve simultaneous condensation of the water content of any product gas flow which includes the desorbed water entrained or otherwise contained in that flow.

The water desorption arrangement can take any number of forms to cause the adsorbed water to desorb from the water adsorbent. In some embodiments, temperature swing adsorption is undertaken to achieve water harvesting. This can be achieved using direct heating methods, or in some cases using magnetic induction swing adsorption.

It should be appreciated that the capture of water from a water containing gas refers to separating, stripping or otherwise removing a water content from that water containing gas. The water containing gas can comprise any gas that has a water content, for example air (particularly atmospheric air), nitrogen laden with water, oxygen laden with water or the like.

It should also be appreciated that the water containing gas can comprise any number of gases, such as nitrogen, oxygen or the like. In embodiments, the water containing gas comprises air, preferably atmospheric air, more preferably ambient air. It is to be understood that ambient air is atmospheric air located in a particular location and a given environment. It is to be understood that the term "ambient air" is intended exclude air that has been subjected to processing for example compressed air, degassed air (such as air degassed of water vapour), filtered air or the like. The apparatus can therefore be used to separate and capture water content from atmospheric air and thereby capture water.

Where atmospheric air is used, the relative humidity of the atmospheric air is preferably between 25 to 100% at 22° C., preferably between 40 to 100% at 22° C., more preferably between 40 to 80% at 22° C. In embodiments, the relative humidity of the atmospheric air is between 40 to 60% at 22° C., and preferably about 50% at 22° C.

The housing of the water apparatus can comprise any suitable container or enclosure having an inlet. The housing typically also includes an outlet through which an exit gas can flow. The exit gas typically has a lower water content than the feed water containing gas, as a water content is adsorbed by the water adsorbent.

The apparatus may also include one or more doors or other sealing arrangements which fit over or otherwise close the inlet and any outlet to enable the housing to form a closed environment (or at least a gas closed environment), and thus enhance desorption and condensation. Any number of sealing doors or sealable opening arrangements may be used. In some embodiments, the inlet and outlet include at least one fluid seal movable from an open position to allow gas to flow through the inlet and outlet, and a closed position where the inlet and outlet are substantially sealed closed to gas flow. The fluid seal can comprise at least one movable door, preferably a least one pivotable plate or flap, more preferably at least one louver.

Metal Organic Framework Composite

The metal organic framework composite can be provided in the apparatus in any suitable form. The inventors envisage that this may be in any number of formulations and forms including shaped bodies (for example pellets or extrusions), coatings, plates, sheets, strips or the like.

That metal organic framework composite may take various forms depending on the desired application, apparatus configuration and adsorption requirements. For example, the metal organic framework composite may comprises a coating applied to the surface of the water desorption arrangement. In other embodiments, the metal organic framework composite comprises shaped water adsorbent composite body.

In one particular form, the metal organic framework composite comprises shaped water adsorbent composite body having at least one mean dimension of greater than 0.5 mm. This shaped water adsorbent composite body is formed from a mixture of a water adsorbent metal organic framework and a hydrophilic binder that is preferably optimised for use in a packed bed adsorption system. The combination of the water absorbent metal organic framework and hydrophilic binder have a surprising synergistic effect, facilitating greater water adsorption compared to the use of other types of binders, for example hydrophobic binders.

For atmospheric water harvesting/capture applications, the inventors have found that three-dimensional shaped bodies with the defined composition have excellent water adsorption properties, and suitable water adsorption kinetics, even at low $H_2O$ partial pressures. The inventive shaped water adsorbent composite body also has useful breakthrough test properties for water capture from a water containing gas (water vapour capture), and has been found to have suitable stability when consolidated, shaped and heated.

Ideally, the shaped water adsorbent composite body should have a good enough affinity for water to adsorb the water, but not have too high affinity for water that excessive energy needs to be expended to desorb water therefrom. Preferably, the heat of adsorption for water and adsorbent range from 10 to 100 kJ/mol MOF for water adsorbed in and/or on the shaped water adsorbent composite body.

Optimising the composition of a shaped water adsorbent composite body involves a number considerations, including:

1. Water stability—the components, and in particular the MOF should be water stable.
2. Adsorption reproducibility, the shaped water adsorbent composite body should retain adsorption capacity after multiple adsorption/desorption cycles, preferably at least 10 cycles, more preferably at least 100 cycles.

3. Ease of production, the shaped water adsorbent composite body and components thereof should be easy to produce from readily available precursor materials.
4. High water uptake from air even at low humidity values.
5. A good affinity for water. The MOF component of the composite body should have a good enough affinity for water to enable the MOF to adsorb the water, but not have too high affinity for water that excessive energy needs to be expended to desorb water therefrom. Here the thermodynamics of water adsorption and desorption need consideration to ensure the MOF does not require excessive energy (kJ/mol MOF) to desorb water therefrom, and thereby adversely affect the energy efficiency of the system.

The MOF and other component materials must also meet food for human consumption regulations in relevant countries where the shaped water adsorbent composite body is required for water production for human consumption.

The shaped water adsorbent composite body preferably has a high adsorption of water from a water containing gas such as air even at low humility levels. In embodiments, the shaped water adsorbent composite body is able to adsorb a water content from a water containing gas, preferably air, having a humidity of greater than 20% at 20° C., preferably from 20 to 100% at 20° C., preferably from 20 to 80% at 20° C., and more preferably from 25 to 60% at 22° C. In embodiments, the humidity of the water containing gas is between 25 to 100% at 22° C., preferably between 40 to 100% at 22° C., preferably between 40 to 80% at 22° C., preferably between 40 to 60% at 22° C., and more preferably about 50% at 22° C. In embodiments, the humidity of the water containing gas is between 20 to 100% at 35° C., preferably between 20 to 80% at 35° C., preferably between 20 to 60% at 35° C., and more preferably about 30% at 22° C.

The shaped water adsorbent composite body preferably has an average surface area of at least 700 $m^2/g$, and preferably greater than 800 $m^2/g$.

The shaped water adsorbent composite body is preferably configured with dimensions that are suitable for use in a packed bed adsorption system, in which a plurality of the shaped bodies are packed at a high packing density 0.10 to 1.0 kg/L, preferably 0.25 to 0.5 kg/L, more preferably between 0.25 and 0.35 kg/L, and yet more preferably about 0.29 kg/L between two support surfaces. The dimensions of the shaped water adsorbent composite body can be optimised to suit this application. For use in a packed bed, the shaped water adsorbent composite body has at least one mean dimension of greater than 0.5 mm. This ensures that the adsorbent composite body has sufficient size to allow gas flow around. For example, fine powder (e.g. having an average particle size of less than 10 micron) typically provides too dense a particle packing for use in a packed bed adsorption system. In some embodiments, the shaped water adsorbent composite body has at least one mean dimension of greater than 0.8 mm, preferably at least 1 mm, preferably at least 1.2 mm, and yet more preferably at least 1.5 mm. In embodiments, each of the mean width, mean depth and mean height of the shaped water adsorbent composite body are greater than 0.5 mm, and preferably greater than 1 mm.

It should be appreciated that "mean dimension" refers to the mean (average) dimension of at least one of the width, depth or height of the shaped water adsorbent composite body. Accordingly, at least one of the mean width, mean depth or mean height must be greater than the specified dimensional value.

The shaped water adsorbent composite body can have any suitable geometry. The shape of the composite bodies has an impact on the pressure drop of local fluid flow (in the vicinity of the bodies), and therefore, the performance of any packed bed adsorption system. For example, the shaped water adsorbent composite body could comprise pellets (for example, disk-shaped pellets), pills, spheres, granules, extrudates (for example rod extrudates), honeycombs, meshes or hollow bodies. In embodiments, the shaped water adsorbent composite body is formed as a three dimensional body, preferably three dimensionally shaped. In particular embodiments, the shaped water adsorbent composite body comprises an elongate body having a circular or regular polygonal cross-sectional shape. For example, the shaped water adsorbent composite body may have a square or triangular cross-sectional shape. In an exemplary form, the shaped water adsorbent composite body comprises an elongate body having a triangular cross-sectional shape, preferably equilateral triangle cross-sectional shape. In one form, the shaped water adsorbent composite body has equilateral triangle cross-section, preferably the sides of the equilateral triangle are at least 1 mm in length, preferably between 1.0 and 1.5 mm in length. The elongate shaped water adsorbent composite body is preferably from 1 to 5 mm in length (longitudinal length), more preferably 1 to 4 mm in length.

Metal-Organic Frameworks

Metal-organic frameworks (MOFs) comprise the major adsorbent constituent of the shaped water adsorbent composite body. MOFs are a crystalline nanoadsorbent with exceptional porosity. MOFs consist of metal atoms or clusters linked periodically by organic molecules to establish an array where each atom forms part of an internal surface. MOFs as a physisorbent achieve strong adsorption characteristics through the internal surfaces of the MOF porous structure. The strength of this interaction depends on the makeup of the adsorbent surface of the MOF to capture $H_2O$ molecules. Advantageously, the surface chemistry and structure of MOFs can be tuned for a specific application, where performance criteria such as adsorption/desorption rate, capacity as a function of pressure, and operating temperature may be of particular importance.

The shaped water adsorbent composite body utilises the selectivity of the MOF to adsorb water rather than other components in the air, such as oxygen and nitrogen. That is, capturing of water from a water containing gas (such as air) using a MOF adsorbent. For this functionality, the shaped water adsorbent composite body comprises at least 50 wt % water adsorbent MOF, preferably at least 70 wt % water adsorbent MOF, more preferably at least 80 wt % water adsorbent MOF, yet more preferably at least 85 wt % water adsorbent MOF and yet more preferably at least 90 wt % water adsorbent MOF.

It should be appreciated that "water adsorbent metal organic framework" means a water stable metal organic framework that has a good affinity for water, adsorbing water even at low humidity values. Preferably, the heat of adsorption for water ranges from 10 to 100 kJ/mol MOF for water adsorbed on the MOF. Ideally, a water adsorbent MOF should have a good enough affinity for water to enable the MOF to adsorb the water, but not have too high affinity for water that excessive energy needs to be expended to desorb water therefrom. Here the thermodynamics of water adsorption and desorption need consideration to ensure the MOF does not require excessive energy (kJ/mol MOF) to desorb water therefrom, and thereby adversely affect the energy efficiency of the system.

Any suitable water adsorbent metal organic framework can be used. In some embodiments, the water adsorbent metal organic framework comprises at least one of aluminium fumarate (AlFu), MOF-801, MOF-841, $M_2Cl_2BTDD$ including $Co_2Cl_2BTDD$, Cr-soc-MOF-1, MIL-101(Cr), CAU-10, alkali metal ($Li^+$, $Na^+$) doped MIL-101(Cr), MOF-303 (Al), MOF-573, MOF-802, MOF-805, MOF-806, MOF-808, MOF-812, or mixtures thereof. In embodiments, the water adsorbent metal organic frameworks are preferably selected from aluminium fumarate, MOF-303, MOF-801, MOF-841, $M_2Cl_2BTDD$, Cr-soc-MOF-1, or MIL-101(Cr).

In particular embodiments, the water adsorbent metal organic framework includes a plurality of multidentate ligands of which at least one ligand is from selected from fumarate (fumaric acid) or 3,5-pyrazoledicarboxylic acid (H3FDC) based ligands. In some embodiment, the metal ion is selected from $Fe^{3+}$, $Li^+$, $Na^+$, $Ca^{2+}$, $Zn^{2+}$, $Zr^{4+}$, $Al^{3+}$, $K^+$, $Mg^{2+}$, $Ti^{4+}$, $Cu^{2+}$, $Mn^{2+}$ to $Mn^{7+}$, $Ag^+$, or a combination thereof. In preferred embodiments, the metal ion is selected from $Zr^4$, $Al^{3+}$ or combinations thereof. Examples include MOF-303, [Al(OH)($C_5H_2O_4N_2$)($H_2O$)] and MOF-573 [Al(OH)($C_5H_2O_4N_2$)($H_2O$)] constructed by linking aluminium (Ill) ions and 3,5-pyrazoledicarboxylic add and AlFu.

In particular embodiments, the water adsorbent metal organic framework comprises a porous aluminium-based metal-organic framework (MOF) comprising inorganic aluminium chains linked via carboxylate groups of 1H-pyrazole-3,5-dicarboxylate (HPDC) linkers, and of formula: [Al(OH)($C_5H_2O_4N_2$)($H_2O$)], wherein: each Al (III) ion is capped by four 0 atoms from four different carboxylate groups and two O atoms from two hydroxyl groups forming $AlO_6$ octahedra, and the $AlO_6$ octahedra form corner-sharing chains, depending on the cis- and trans-position of the two adjacent bridging hydroxyl groups, helical chains in MOF-303 (cis-) and MOF-573 (trans-) form respectively.

In embodiments, the MOF is MOF-303, wherein: the linkers further bridge two of the chains together, leading to the formation of a 3D framework delimiting square-shaped one dimensional channels with diameter of 6 Å in diameter (measured by the largest fitting sphere); the MOF-303 has a topology of xhh; and/or the MOF has permanent porosity and a Brunauer-Emmett-Teller (BET) surface area of 1380 and pore volume of 0.55 $cm^3$ $g^{-1}$.

In embodiments, the MOF is MOF-573, wherein: the linkers further bridge two of the chains together, leading to the formation of a 3D framework delimiting square-shaped one dimensional channels with diameter of 5 Å in diameter (measured by the largest fitting sphere); the MOF has a topology of upt; and/or the MOF has permanent porosity and a Brunauer-Emmett-Teller (BET) surface area of 980 $m^2$ $g^{-1}$ and pore volume of 0.56 $cm^3$ $g^{-1}$.

Water production for human consumption requires the use of materials that meet food for human consumption regulations in the relevant countries. Therefore in an exemplary embodiment, the water adsorbent MOF comprises aluminium fumarate (AlFu) MOF. Applicant notes that the advantage of using AlFu is that it is the MOF is cheap and easy to make.

The water adsorbent metal organic framework should preferably embody a number of properties to maximise the functionality of the shaped water adsorbent composite body. For example, the water adsorbent metal organic framework preferably has an average surface area of at least 700 $m^2/g$, and preferably greater than 800 $m^2/g$. The water adsorbent metal organic framework also preferably has a pore size of at least 2 nm, preferably greater than 5 nm. The pore size should be sufficient to at least fit a water molecule therein.

In the present invention, the water adsorbent MOF is provided as a pulverulent material preferably a powder or particulates. In embodiments, the water adsorbent metal organic framework has a particle size of less than 800 μm, preferably less than 600 μm, and more preferably less than 500 μm. In particular embodiments, the water adsorbent MOF powder has a particle size of less than 500 μm, preferably less than 300 μm, more preferably less than 212 μm, yet more preferably less than 150 μm, and in some embodiments less than 88 μm. It should be appreciated that particle size is typically measured in terms of mesh size through which the particles are sieved. Therefore in embodiments, the water adsorbent MOF powder has a particle size of less than 60 mesh (250 μm), preferably less than 100 mesh (149 μm), preferably less than 140 mesh (105 μm), and more preferably less than 170 mesh (88 μm). The water adsorbent MOF powder preferably also has a mean particle size of between 10 and 100 μm, more preferably between 20 and 80 μm. In other embodiments, the water adsorbent MOF powder has a mean particle size of between 10 and 80 μm, and preferably between 20 and 60 μm.

Hydrophilic Binder

A water adsorbent MOF powder mixture is not ideal if used in a packed bed adsorption system. Powder alone packs too densely and therefore has too great of pressure drop across the adsorption unit. Therefore powder alone cannot be used. The inventors have found that the water adsorbent MOF should be shaped prior to packing into a packed bed water adsorbent system to form a shaped water adsorbent composite body, for example a pellet, for use in a packed bed adsorption system.

The shaping process is facilitated through the use of a binder. Whilst it may be possible to form a shaped composite body without the use of a binder, shaped composite bodies that include binders in their composition tend to have greater structural strength and stability when used in a packed bed water adsorbent system. A shaped composite body such as a pellet therefore facilitates continuous operation of a packed bed adsorption system.

The inventors have surprisingly found that a hydrophilic binder must be used to impart optimal water adsorption properties to the shaped water adsorbent composite bodies. The inventors have found that non-hydrophilic binders, in particular hydrophobic binders (for example cellulose siloxane), deliriously affect the water adsorption properties of the shaped water adsorbent composite bodies. The use of a hydrophilic binder is therefore important for optimal moisture capture properties of the packed bed water adsorption system.

A variety of hydrophilic binders may be used in the shaped water adsorption body. The hydrophilic binder can be organic or inorganic, and should not block the pores of the water adsorbent MOF. In some embodiments, the hydrophilic binder comprises a hydrophilic cellulose derivative, preferably alkyl cellulose, hydroxyalkyl cellulose, or carboxyalkyl cellulose derivatives. Particularly suitable hydrophilic binders can be selected from at least one of hydroxypropyl cellulose (HPC), hydroxypropyl cellulose, hydroxyethyl methyl cellulose, hydroxypropyl methyl cellulose (HPMC), ethyl hydroxyethyl cellulose, methyl cellulose, or carboxymethyl cellulose (CMC). However, it should be appreciated that other binders are also possible. In preferred embodiments the hydrophilic binder comprises hydroxypropyl cellulose (HPC). It should be appreciated that the additives depend on the application in which the shaped bodies are being used. Where water is being produced for human consumption the binder(s) preferably comprise an approved excipient for human consumption. Examples of approved excipients for human consumption include approved excipients for food or pharmaceuticals. Approved food grade or pharmaceutical grade binders are preferred.

The shaped water adsorbent composite body includes at least 0.1 wt % hydrophilic binder, and preferably at least 0.2 wt % hydrophilic binder. In embodiments, the shaped water adsorbent composite body includes between 0.2 and 5 wt % hydrophilic binder. In some embodiments, the shaped water adsorbent composite body can comprise between 0.5 and 3 wt % hydrophilic binder, more preferably between 0.8 and 2 wt % hydrophilic binder, and yet more preferably about 1 wt % hydrophilic binder. It should be appreciated that the amount of binder is selected based on the properties and particle size (mean size and particle distribution) of the water adsorbent MOF.

Lubricants

The shaped water adsorbent composite body preferably comprises less than 0.5 wt % lubricant, preferably less than 0.1 wt % lubricant. Suitable lubricants include surfactants and their salts. Examples of suitable lubricants include magnesium stearate, aluminium oxide, sodium oleate, glycerides, di-glycerides, tri-glycerides, fatty acids, oils including silicon oils and mineral oils and mixtures thereof. It should be appreciated that the additives depend on the application in which the shaped bodies are being used. Where water is being captured and produced for human consumption the lubricants preferably comprise an approved excipient for human consumption. Examples of approved excipients for human consumption include approved excipients for food or pharmaceuticals. Approved food grade or pharmaceutical grade lubricants are preferred. As discussed below, one or more lubricant is added to the mixture to assist with shaping and forming processes when making the shaped water adsorbent composite body.

Packed Bed Adsorption Apparatus

In some embodiments, the apparatus comprises a packed bed adsorption system that includes shaped composite MOF bodies as discussed above. In such embodiments, the water adsorbent is a metal organic framework composite comprising: at least 50 wt % water adsorbent metal organic framework; and at least 0.1 wt % hydrophilic binder and has at least one mean dimension of greater than 0.5 mm. In this aspect, the shaped bodies are collected in a packed bed that is enclosed in the housing. The housing is preferably a fluid tight housing.

The housing preferably includes two spaced apart support membranes configured to allow gas flow therethrough each membrane. The plurality of said shaped water adsorbent composite bodies form a packed bed therebetween and being compressed therebetween. In embodiments, the shaped water adsorbent composite bodies are packed at a density from 0.10 to 1.0 kg/L, preferably 0.25 to 0.5 kg/L, and more preferably between 0.25 and 0.35 kg/L. In some embodiments, the shaped water adsorbent composite bodies are packed at a density of about 0.25 kg/L. In other embodiments, the shaped water adsorbent composite bodies are packed at a density of about 0.29 kg/L. As with any packed bed, it is important that the adsorbent is packed tightly and substantially uniformly throughout the packed bed volume to avoid short circuiting of any adsorbent in that packed bed. Any flow that is able to avoid or follow a shorter/short circuit route through the packed bed will avoid having water removed from that stream. Short circuit flow would adversely affect the energy efficiency and water production rate of the system. Tight and uniform packing also ensures uniform path lengths to optimise adsorption performance.

The apparatus may use a low or reduced pressure (sometimes referred to as a vacuum environment) to direct the released water to the condenser. In embodiments, the pressure is less than 100 mbar, preferably less than 50 mbar, more preferably less than 35 mbar. In other embodiments, the pressure is less than 500 mbar. In other embodiments, the released water is entrained in a gas flow, for example a flow of the water containing gas or another gas such as an inert or other dry gas, and directed to the condenser.

The flow rate of the water containing gas can also be varied to optimise the water adsorption of the packed bed of shaped water adsorbent composite bodies. In embodiments, the water containing gas is fed through the packed bed of shaped water adsorbent composite bodies at as fast a flow rate that is possible for the apparatus whilst the water adsorbent MOF is still adsorbing water from the water containing gas. It should be appreciated that the particular flow rate is dependent on the water content of the water containing gas, as this determines the mass of water a particular volume of gas will contain. The water content of the water containing gas is dependent on the relative humidity of that containing gas as well as the temperature and pressure. Where the apparatus is fed ambient air, a higher flowrate will be required for lower humidity air as compared to higher humidity air at the same temperature to maintain a desired cycle time.

The source of humid air used can be a very low relative humidity, mimicking the humidity levels found on the driest places on Earth. In embodiments, the humidity of the air is greater than 20% at 20° C., preferably from 20 to 100% at 20° C., preferably from 20 to 80% at 20° C., and more preferably from 25 to 60% at 22° C. In embodiments, the humidity of the air is between 40 to 100% at 22° C., preferably between 40 to 100% at 22° C., preferably between 40 to 80% at 22° C., preferably between 40 to 60% at 22° C., and more preferably about 50% at 22° C. In embodiments, the humidity of the air is between 20 to 100% at 35° C., preferably between 20 to 80% at 35° C., preferably between 20 to 60% at 35° C., and more preferably about 30% at 22° C.

The packed bed adsorption system of the present invention is configured for magnetic induction swing water harvesting (adsorption-desorption cycling). Here, the water adsorbent is a Magnetic Framework Composite comprising a mixture of at least 50 wt % water adsorbent metal organic framework and from 0.2 to 10 wt % magnetic particles having a mean particle diameter of less than 200 nm, and the water desorption arrangement comprises an alternating current (AC) magnetic field generator located within and/or around the water adsorbent configured to apply an AC magnetic field to the water adsorbent. The water adsorbent preferably comprises shaped water adsorbent composite bodies located in a packed bed in the housing. The shaped water adsorbent composite bodies are preferably packed at a density from 0.10 to 1.0 kg/L, preferably 0.25 to 0.5 kg/L, and more preferably between 0.25 and 0.35 kg/L.

The AC magnetic field generator preferably comprises at least one induction coil located within and/or around the packed bed of shaped water adsorbent composite bodies. The alternating current magnetic field generator is designed to irradiate the packed bed of shaped water adsorbent composite bodies with an AC magnetic field to release adsorbed water from the packed bed of shaped water adsorbent composite bodies when activated.

Magnetic Particles

Where inductive heat generation is desired to use for water desorption, the shaped water adsorbent composite body may include magnetic particles. In these embodiments the shaped water adsorbent composite body contains from 0.2 to 10 wt % magnetic particles having a mean particle diameter of less than 200 nm. In some embodiments, the shaped water adsorbent composite body may comprises between 0.5 and 7 wt % magnetic particles, and in some embodiments between 1 to 5 wt % magnetic particles.

The use of this composite material combines the exceptional adsorption performance of MOFs and enables the use of high efficiency of magnetic induction heating to desorb water from the MOF. The shaped water adsorbent composite body is formed of a magnetic framework composite (MFCs), a composite material which combines magnetic particles with MOF crystals. The incorporation of magnetic particles (typically micro- or nano-sized magnetic particles) with MOFs allows the generation of heat on exposure to an alternating current (AC) magnetic field. MFCs can therefore be regenerated using an AC magnetic field, as a result of generating heat within the composite material, and which in return releases the adsorbed fluid from the pores of the MOF part of the MFC.

This process uses the heat generated as a result of static hysteresis and dynamic core losses of ferro/ferrimagnetic particles induced by an external AC magnetic field. The generation of heat via induction heating occurs remotely, and resultant heat is targeted, making the heating process isolated and thus energy efficient.

The magnetic properties of the magnetic framework composites are provided by the magnetic particles mixed within the composite. As outlined above, the magnetic particles can be utilised to generate heat on exposure to an alternating current (AC) magnetic field, and thereby can be used to conduct magnetic induction swing adsorption process for water adsorbed on the water adsorbent MOF.

The amount of magnetic particles is selected to provide a desired heat generation profile and magnitude on the application an AC magnetic field. Typically, the amount of magnetic particles in the shaped water adsorbent composite body is between 0.2 and 10 wt %. In embodiments, the shaped water adsorbent composite body may comprise between 0.5 and 7 wt % magnetic particles, and preferably between 1 to 5 wt % magnetic particles.

A wide variety of magnetic particles can be used in the inventive shaped adsorption body. In embodiments, the magnetic particles comprise ferromagnetic, paramagnetic, or superparamagnetic particles. In embodiments, the magnetic particles comprise metal chalcogenides. Suitable metal chalcogenides comprise magnetic particles comprising any combination of element or ionic form thereof of M selected from at least one of Li, Na, K, Rb, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, Si, Ge, Sn, Pb, As, Sb, Bi, or their combinations, in combination with elements or elemental form of at least one of O, S, Se, or Te. In some embodiments, the metal chalcogenide have the formula $M_xN_yC_z$, where M and N are selected from at least one of Li, Na, K, Rb, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, Si, Ge, Sn, Pb, As, Sb, Bi, C is selected from at least one of O, S, Se, Te, x is any number from 0 to 10, y is any number from 0 to 10 and z is any number from 0 to 10. The metal chalcogenide particles may in some embodiments have a core-shell structure in which the core comprises at least one metal chalcogenide as previously described and the shell comprises at least one metal chalcogenide as previously described. In some forms, the core-shell structure may include multiple shells. In embodiments, the magnetic particles comprise at least one of $MgFe_2O_4$, $Fe_3O_4$, $CoFe_2O_4$, $NiFe_2O_4$, Pyridine-2,6-diamine-functionalized $SiO_2$, Pyridine-2,6-diamine-functionalized $Fe_3O_4$, or C-coated Co.

The magnetic particles can comprise any number of shapes and configurations. In embodiments, the magnetic particles comprise particles having irregular shapes. In some embodiments, the magnetic particles comprise particles having regular three-dimensional shapes, for example spherical, platelet, rod, cylindrical, ovoidal or the like. In some embodiments, the magnetic particles comprise a plurality of magnetic nanospheres. The size of the magnetic particles is typically selected for the desired packed bed application and configuration. Generally, the magnetic particles comprise nano- or micro-particles. The magnetic particles have a mean particle diameter of less than 200 nm, preferably less than 150 nm, more preferably between 1 to 100 nm. In some embodiments the magnetic particles have a mean particle diameter of less than 50 nm. In some embodiments the magnetic particles have a mean particle diameter of between 1 and 200 nm, preferably between 5 and 100 nm, more preferably between 5 to 30 nm, and yet more preferably between 5 to 30 nm. In some embodiments, the magnetic particles have a mean particle diameter of around 20 nm. It is noted that the magnetic particles need to be large enough to not foul the pores of the water adsorbent MOF.

The combination of the magnetic particles with MOFs to form a magnetic framework composite material yields an adsorbent with exceptional adsorption behaviour as a result of the MOFs and high efficiency of induction heating as a result of the magnetic particles.

Method of Capturing Water Content from a Water Containing Gas

A second aspect of the present invention provides a method of capturing a water content from a water containing gas, comprising at least one cycle of:

feeding a water containing gas through the inlet of a housing and over a water adsorbent enclosed within the housing such that the water adsorbent adsorbs water from the water containing gas, the water adsorbent comprising at least one water adsorbent metal organic framework composite capable of adsorbing a water content from the water containing gas, the metal organic framework composite comprising: at least 50 wt % water adsorbent metal organic framework; from 0.2 to 10 wt % magnetic particles having a mean particle diameter of less than 200 nm; and at least 0.1 wt % hydrophilic binder comprising a hydrophilic cellulose derivative, operating at least one water desorption arrangement to change from an inactive state to an activated state to apply an alternating current magnetic field to a packed bed of shaped water adsorbent composite bodies, thereby generating heat within the shaped water adsorbent composite bodies, so to release at least a portion of the adsorbed water therefrom into a product fluid flow, and directing the product fluid flow to a condenser system to separate a water content from the product fluid flow, wherein the water desorption arrangement is in contact with and/or surrounding the water adsorbent.

The second aspect of the present invention also provides a method of capturing a water content from a water containing gas using the apparatus according to the first aspect of the present invention. The method comprises at least one cycle of:

feeding a water containing gas through the inlet of the housing and over the water adsorbent such that the water adsorbent adsorbs water from the water containing gas, the water desorption arrangement being in the deactivated stated;

operating the at least one water desorption arrangement in the activated state to apply an alternating current magnetic field to a packed bed of shaped water adsorbent composite bodies, thereby generating heat within the shaped water adsorbent composite bodies, so to release at least a portion of the adsorbed water therefrom into a product fluid flow; and directing the product fluid flow to a condenser system to separate a water content from the product fluid flow.

In this aspect of the present invention a moisturized gas stream is fed over the water adsorbent. After the absorbent is charged with water vapour, the water desorption arrangement is activated to heat. Consequently, the water adsorbent is driven to release at least part of the adsorbed water content. The desorbed water can be condensed in a condenser system, for example in a cold trap.

It should be appreciated that the apparatus and features thereof used in the method of this second aspect of the present invention can also include the features previously taught in relation to the first aspect.

The method preferably further comprises the step of: closing the inlet and outlet of the housing prior to operating the at least one water desorption arrangement. This creates a closed gas sealed environment in the housing allowing capture of the water content therein. The relative humidity inside the housing increases to high values, and water condenses in the condenser system for collection.

It is to be understood that this method is a cyclical method, where the steps of adsorbing water in the water adsorbent, releasing that adsorbed water through operation of the water desorption arrangement and condensing that water is conducted in a repetitive cycle so to continuously produce water. The cycle time typically depends on configuration of the water adsorbent and the adsorption system, the amount of water adsorbent MOF, breakthrough point, saturation point, temperature, pressure and other process conditions. In some embodiments, one cycle of the method has a duration of less than 10 hours, preferably less than 8 hours, more preferably less than 7 hours, and more preferably 6 hours or less. In other embodiments, the cycle time of this method steps are approximately 30 minutes in duration. However, other cycle times between 10 minutes to 10 hours could be possible depending on the configuration of the apparatus.

As noted above, the apparatus of the present invention can be configured for temperature swing water harvesting (adsorption—desorption cycling). In these systems, a heat source is required to heat the packed bed of shaped water adsorbent composite bodies.

The apparatus of the present invention is configured for magnetic induction swing water harvesting. Here, the step of operating the at least one water desorption arrangement comprises applying an alternating current magnetic field to a packed bed of shaped water adsorbent composite bodies, thereby generating heat within the shaped water adsorbent composite bodies, so to release at least a portion of the adsorbed water therefrom into a product fluid flow, the shaped water adsorbent composite comprises at least 50 wt % water adsorbent metal organic framework; and at least 0.1 wt % hydrophilic binder and from 0.2 to 10 wt % magnetic particles having a mean particle diameter of less than 200 nm.

The shaped water adsorbent composite bodies in this method undergo magnetic induction vacuum swing adsorption to capture water from the water containing gas fed into the packed bed of shaped water adsorbent composite bodies. Application of the AC magnetic field depends on the amount of moisture adsorbed in the shaped water adsorbent composite bodies in the packed bed. This method therefore takes advantage of the high energy conversion efficiency of magnetic induction heating. In embodiments, the apparatus and method has an energy conversion efficiency of greater than 90%, preferably greater than 95% and in some embodiments up to 98% was achieved. Furthermore, the use of rapid heating through magnetic induction heating enables short cycle times to be achieved. In embodiments, the method has a cycle time of less than 2 hours, preferably less than 1 hour.

Adsorption is a transient process. The amount of material adsorbed within a bed depends both on position and time. The active adsorption region of a packed bed shifts away from the inlet and through the bed as time goes on. This mass transfer zone moves through the bed until it "breaks through". The fluid emerging from the bed will have little or no solute remaining—at least until the bulk of the bed becomes saturated. The breakthrough point occurs when the concentration of the fluid leaving the bed spikes as unadsorbed solute begins to emerge. The bed still adsorbs water, though at a slower rate than before the breakthrough point until the bed becomes saturated, and no further water can be adsorbed, defined as the "saturation point" of the bed. Therefore, in terms of the saturation point of the packed bed, the alternating current magnetic field is preferably applied when the packed bed has adsorbed water equivalent to at least 75% of the saturation point, preferably at least 80%, more preferably at least 90% of the saturation point of the packed bed. This ensures that the adsorption capacity of the packed bed is substantially utilised, but allows the water to be released before the packed bed is fully saturated.

The AC magnetic field is applied for a length of time required to substantially release the water adsorbed on the shaped water adsorbent composite bodies in of the packed bed. That application time depends on the shape, size and configuration of the packed bed, shape, size and configuration of the AC magnetic field generator, the applied magnetic field strength and the amount of magnetic particles in the shaped water adsorbent composite bodies. In some embodiments, the AC magnetic field is applied for at least 1 second. In embodiments, the AC magnetic field is applied for between 1 and 120 seconds, preferably between 1 and 60 seconds, more preferably from 10 to 30 seconds.

The magnetic field strength applied to the packed bed of shaped water adsorbent composite bodies is typically tailored to the shape, size and configuration of that packed bed. In embodiments, the magnetic field strength is at least 10 mT, preferably at least 12 mT, preferably about 12.6 mT. However, it should be appreciated that the selected magnetic field strength depends on the particular application, and is generally selected to provide the lowest power consumption and thus lowest magnetic field strength for the maximum heat to desorb water from the water adsorbent MOF. The frequency of the AC magnetic field can be selected to provide maximum heating. In embodiments, the frequency of the AC magnetic field is between 200 and 300 kHz, preferably between 250 and 280 kHz, and more preferably from 260 to 270 kHz. Again, the frequency can be selected for a particular application and be tailored/optimised to provide the greatest heating for the lowest power consumption.

Again, it should be appreciated that the water containing gas can comprise any number of gases, such as nitrogen, oxygen or the like. In embodiments, the water containing gas comprises air, preferably atmospheric air, more preferably ambient air. The method can therefore by used to separate and capture water content from atmospheric air and thereby capture water.

The condenser system is used separate the water content of the product fluid flow (typically gas with entrained water vapour) to produce water. It is to be understood that a large variety of condenser arrangements are possible, and are selected to meet the particular requirements of a designed system. The condenser is used to convert water vapour in the product fluid flow into liquid water. In some embodiments, the condenser comprises a heat transfer/cooling device such as a cooling trap, air coils, surface condensers or another heat exchange device.

In some embodiments, the metal organic framework adsorbent can be activated before use (i.e. use for moisture adsorption) by triggering them by heating the composite bodies and passing (feeding) a dry nitrogen stream through the column. Where the water adsorbent comprises composite bodies that include magnetic particles, heating can be achieved with an alternating current magnetic field. Activation of the material was performed until the humidity of the out coming gas stream was zero.

Overall, the method and associated apparatus has a water production capacity of at least 2.8 L/kg of MOF, more preferably at least 3.5 L/kg of MOF, yet more preferably at least 4 L/kg of MOF, and in some embodiments about 4.1 L/kg of MOF at 20% RH and 35° C. The typical energy use is between 10 and 15 kWh/L, typically around 12 kWh/L water produced.

Magnetic Swing Apparatus for Capturing Water from a Water Containing Gas

A third aspect of the present invention provides an apparatus for capturing a water content from a water containing gas, the apparatus comprising:

a housing containing therein a packed bed of shaped water adsorbent composite bodies having at least one mean dimension of greater than 0.5 mm and comprising at least 50 wt % water adsorbent metal organic framework; at least 0.1 wt % hydrophilic binder and from 0.2 to 10 wt % magnetic particles having a mean particle diameter of less than 200 nm; and an alternating current (AC) magnetic field generator located within and/or around the packed bed of shaped water adsorbent composite bodies configured to apply an AC magnetic field to the packed bed of shaped water adsorbent composite bodies.

This third aspect of the present invention provides a water capturing apparatus that includes shaped bodies that uses magnetic swing induction heating to desorb water adsorbed within and on the shaped bodies. In this aspect, the shaped bodies are collected in a packed bed that is enclosed in the housing. The housing is preferably a fluid tight housing. The apparatus also includes an alternating current magnetic field generator designed to irradiate the packed bed of shaped water adsorbent composite bodies with an AC magnetic field to release adsorbed water from the packed bed of shaped water adsorbent composite bodies when activated. The apparatus is configured to enable the shaped water adsorbent composite bodies to undergo magnetic induction swing adsorption to capture water from a water containing gas fed into the packed bed of shaped water adsorbent composite bodies.

Any AC magnetic field generator can be used which is capable of applying a localised AC magnetic field to the packed bed of shaped water adsorbent composite bodies. In some embodiments, the AC magnetic field generator comprises at least one induction coil located within and/or around the packed bed of shaped water adsorbent composite bodies. Preferably, one or more induction coils are embedded within and surrounded by the shaped water adsorbent composite bodies in the packed bed so to use the whole magnetic field generated by the induction coil or coils. In some embodiments, the induction coil or coils are configured to sit within a central section of the packed bed, occupying from 50% to 90%, preferably from 70 to 80% of the axial height (depth) of the packed bed.

The housing has a fluid inlet and a fluid outlet through which a fluid, preferably the moisture containing gas and product fluid is configured to flow. The housing can have any suitable configuration. In some embodiments, the housing comprises a container or canister, for example a substantially cylindrical container or canister. The housing is preferably fluid tight, with only fluid access and egress through the inlet and outlet of that housing. In other embodiments, the housing comprises a flat, high surface area container. It should be appreciated that a variety of container and canister shapes and configurations could be used. The housing may be exchangeable or is installed fixed in the system.

The plurality of said shaped water adsorbent composite bodies is preferably arranged in the housing in a packed bed system. The housing can include two spaced apart support membranes configured to allow gas flow therethrough each membrane, the plurality of said shaped water adsorbent composite bodies forming a packed bed therebetween and preferably being compressed therebetween. The apparatus of this fifth aspect can further include a condenser system for cooling a fluid flow from the packed bed of shaped water adsorbent composite bodies. A variety of condensers can be used. In embodiments, the condenser comprises a cooling device, for example a cooling trap.

The Inventors have found that potable water can be expeditiously produced using the apparatus of this aspect of the present invention. This apparatus utilises a packed bed of the shaped water adsorbent composite bodies of the first aspect of the present invention in a magnetic induction vacuum swing adsorption system to separate and thus capture water from an water bearing gas (such as humid air) and release and harvest that captured content using a condenser.

A fourth aspect of the present invention provides a method of capturing a water content from a water containing gas using the apparatus according to the fifth aspect of the present invention, comprising at least one cycle of (the steps of):

feeding a water containing gas through the packed bed of shaped water adsorbent composite bodies of said apparatus such that the shaped water adsorbent composite bodies adsorb water from the water containing gas;

applying an alternating current magnetic field to the shaped water adsorbent composite bodies using the alternating current magnetic field generator of said apparatus, thereby generating heat within the shaped water adsorbent composite bodies, so to release at least a portion of the adsorbed water therefrom into a product fluid flow; and directing the product fluid flow to a condenser to separate a water content from the product fluid flow.

In this fourth aspect of the present invention a moisturized gas stream is fed through a packed adsorption column. After the absorbent is charged with water vapour, an alternating current magnetic field is applied. Consequently, the pellets start heating up rapidly forcing the water to be released. The desorbed water is condensed in a condenser, for example in a cold trap. This method therefore takes advantage of the high energy conversion efficiency of magnetic induction heating. In embodiments, the apparatus and method has an energy conversion efficiency of greater than 90%, preferably greater than 95% and in some embodiments up to 98% was achieved. Furthermore, the use of rapid heating through magnetic induction heating enables short cycle times to be achieved.

It is to be understood that this method is a cyclical method, where the steps of adsorbing water in the shaped water adsorbent composite bodies, releasing that adsorbed water through application of the AC magnetic field and condensing that water is conducted in a repetitive cycle so to continuously produce water. The cycle time typically depends on the configuration of the packed bed and the adsorption system, the amount of shaped water adsorbent composite bodies, the depth of the packed bed, breakthrough point, saturation point and characteristics of the particular pack bed, temperature, pressure and other process conditions. In some embodiments, the cycle time of this method steps are approximately 30 minutes in duration. However, other cycle times between 10 minutes to 2 hours could be possible depending on the configuration of the apparatus and packed bed and process conditions.

Method of Forming Shaped Water Adsorbent Composite Body

The present invention can also provide a method of forming a shaped water adsorbent composite body for the adsorption system of the first aspect. The method comprises the steps of:

preparing a composite powder mixture comprising at least 50 wt % water adsorbent metal organic framework; at least 0.1 wt % hydrophilic binder; and 0.2 to 10 wt % magnetic particles having a mean particle diameter of less than 200 nm;

preparing a composite paste comprising a mixture of the composite powder mixture and a solvent;

forming the composite paste into a shaped body having at least one mean dimension of greater than 0.5 mm; and heating the shaped body to substantially remove the solvent from the shaped body, thereby producing a shaped water adsorbent composite body for use in a packed bed adsorption system.

This aspect of the present invention provides a method of forming the shaped water adsorbent composite body used in various embodiments of the present invention. In this method, the composite powder mixture (typically a pulverulent material) comprising a powder mix of metal organic framework and a hydrophilic binder, is formed into a paste using a solvent, which can then be shaped, for example by extrusion or palletising processes into the desired shaped body.

The solvent used to form the shaped body can be any suitable solvent that has good interaction with the constituents of the composite powder mixture. Suitable solvents are preferably selected from a non-basic polar solvent and/or a non-self ionising polar solvent. The solvent preferably comprises an alcohol, such as methanol, ethanol, C2-C9 alcohols including their branched isomers, or water, more preferably deionised water.

The hydrophilic binder and a liquid solvent are added to the composite powder mixture to assist in the formation of a suitable paste for shaping processes. It should be appreciated that the composite paste comprises a thick, soft, moist mixture. The paste preferably has sufficient viscosity to retain a form when shaped into a desired configuration in the forming/shaping step. The amount of solvent and composite powder material (a pulverulent material, preferably powder or particulates) is typically mixed to provide a suitable paste consistency for shaping processes such as extrusion or pelletising.

It is also important to appreciate that the shaped body preferably comprises the water adsorbent MOF and the hydrophilic binder. The solvent is purely used to form the paste which is evaporated or otherwise removed from the shaped composite material during the heat treatment step.

Magnetic particles are included in the formed shaped composite material. In these embodiments the composite powder mixture further comprises from 0.2 to 10 wt % magnetic particles having a mean particle diameter of less than 200 nm.

The composite paste can be formed into the shaped body using a variety of processes. In embodiments, forming the composite paste into a shaped body comprises at least one of extruding, pelletising or moulding the composite paste into a desired three-dimensional configuration. Preferred methods include rod extrusion or tableting. Where the shaped body is formed by an extrusion or similar process such that the composite paste is extruded into an elongate body, that elongate body is preferably subsequently longitudinally divided, typically to a length suitable used in a packed bed of a packed bed adsorption system. It is preferred that after extrusion the extruded elongated body is allowed to dry, for example air dry, for a period of time prior to being longitudinally divided. That drying time can vary, but is typically at least 10 minutes. Afterwards, the extruded body is cut into 3 to 5 mm long shaped bodies, preferably pellets.

The shaping step can be performed in the presence of lubricants and/or other additional substances that stabilize the materials to be agglomerated. Suitable lubricants include surfactants and their salts. Examples of suitable lubricants include magnesium stearate, aluminium oxide, sodium oleate, glycerides, di-glycerides, tri-glycerides, fatty acids, oils including silicon oils and mineral oils and mixtures thereof. It should be appreciated that the additives depend on the application in which the shaped bodies are being used. The lubricants preferably comprise an approved excipient for human consumption where water is being produced for human consumption. Examples of approved excipients for human consumption include approved excipients for food or pharmaceuticals. Approved food grade or pharmaceutical grade lubricants are preferred. As discussed below, lubricants are added to the mixture to assist with shaping and forming processes when making the shaped body. In some embodiments, the lubricant can be mixed in the powder mixture with the binder to form part of the powder mixture. In other embodiments, the lubricant is applied to the surface of the shaping device, for example an extruder or pelletiser, to lubricate the outer surface only. The resulting shaped water adsorbent composite body preferably comprises less than 0.5 wt % lubricant, preferably less than 0.1 wt % lubricant.

The shaped body/bodies are preferably formed with dimensions that are suitable for use in a packed bed adsorption system, in which a plurality of the shaped bodies are packed at a high packing density 0.10 to 0.5 kg/L, preferably 0.25 to 0.4 kg/L between two support surfaces. The dimensions of the shaped body can be optimised to suit this application. The shaped water adsorbent composite body has at least one mean dimension of greater than 0.5 mm when used in a packed bed adsorption system. This ensures the adsorbent composite body has sufficient size to allow gas flow around. For example, fine powder (for example having an average particle size of less than 10 micron) provides too dense packing for use in a packed bed of a packed bed adsorption system. In some embodiments, the shaped body has at least one mean dimension of greater than 0.8 mm, preferably at least 1 mm, preferably at least 1.2 mm, and yet more preferably at least 1.5 mm. Preferably, each of the mean width, mean depth and mean height of the shaped body are greater than 0.5 mm, and preferably greater than 1 mm.

The shaped body can be formed to have any suitable geometry. The shape of the shaped water adsorbent composite body has an impact on the pressure drop of local fluid flow (in the vicinity of the bodies), and therefore, the performance of any packed bed adsorption system. For example, the shaped body could comprise pellets, for example, disk-shaped pellets, pills, spheres, granules, extrudates, for example rod extrudates, honeycombs, meshes or hollow bodies. In embodiments, the shaped body is three dimensional, preferably three dimensionally shaped. In particular embodiments, the shaped body comprises an elongate body having a circular or regular polygonal cross-sectional shape. In preferred embodiments, the shaped body comprises a triangular cross-sectional shape, and more preferably an equilateral triangle cross-sectional shape. For example, the shaped body may have a square or triangular cross-sectional shape. In one form, the shaped body has equilateral triangle cross-section, preferably the sides of the equilateral triangle are at least 1 mm in length, preferably between 1.0 and 1.5 mm in length. The elongate shaped body is preferably from 1 to 5 mm in length (longitudinal length), more preferably 1 to 4 mm in length. In some embodiments, the elongate shaped body is 3 to 5 mm in length.

The heating step is preferably conducted for sufficient time to remove the solvent from the shaped body. The heating step is preferably conducted at a temperature of between 80 to 150° C., preferably between 90 and 120° C. The heating step can be conducted for at least 1 hour, preferably at least 2 hours, more preferably at least 5 hours, yet more preferably at least 8 hours, and yet more preferably at least 10 hours. Similarly, the pressure is selected to assist solvent removal. In embodiments, the pressure is less than 100 mbar, preferably less than 50 mbar, more preferably less than 35 mbar. In other embodiments, the pressure is less than 500 mbar. In some embodiments, the heating step is conducted in an insert gas atmosphere, for example nitrogen or argon.

The heating step can include an additional activation step where the shaped adsorption body/bodies are dried at an elevated temperature to ensure the pores of the water adsorbent MOF are free of moisture or solvent. In some embodiments, this activation heating step comprises heating the shaped adsorption body to at least 120° C., preferably between 120 and 150° C. for at least 5 hours, preferably at least 6 hours, more preferably from 6 to 10 hours, and more preferably from 6 to 8 hours. The activation heating step is preferably conducted at a reduced pressure of less than 200 mbar, preferably less than 100 mbar, and more preferably less than 50 mbar. In some embodiments, the shaped adsorption body is heated to a temperature of 130° C. at a pressure of less than 200 mbar, preferably less than 100 mbar, more preferably less than 50 mbar to activate the MOF for 6 to 8 hours.

In other embodiments, the shaped adsorption bodies can be activated by triggering them with an alternating current magnetic field within an inert gas flow, for example dry nitrogen stream. Activation of the shaped adsorption bodies can be performed until the humidity of the out-coming gas stream is zero.

After heating, the material is preferably cooled down to at most 80° C., preferably at most 60° C. under reduced pressure of at most 500 mbar, preferably at most 100 mbar.

It should be appreciated that that water produced from the apparatus and method according to embodiments of the present invention can be used for any purpose, including but not limited to:

Water as a substrate for energy production or synthesis of chemicals or the like;
Water for specialised use such as ultra-pure water for medical or laboratory use or the like;
Water for use in defense or medical sectors;
Water for industrial applications such as farming, irrigation, quenching fire or the like;
Water for consumption such as house hold use, bottled water, food production or the like.

BRIEF DESCRIPTION OF THE DRAWINGS

The present invention will now be described with reference to the Figures of the accompanying drawings, which illustrate particular preferred embodiments of the present invention, wherein.

DETAILED DESCRIPTION

The present invention provides an apparatus that provides selective control of the adsorbing and desorbing phases of a MOF based water adsorbents water harvesting cycle. The apparatus includes a water desorption arrangement which allows the MOF based water adsorbent to adsorb water when in a deactivated state, and then apply desorption conditions to the water adsorbent to desorb water from the water adsorbent when in an activated state. This selective operation of the water desorption arrangement between the deactivated and activated states enables the efficiency of water desorption arrangement to be optimised using more efficient energy desorption arrangements to desorb water from the metal organic framework based water adsorbent compared for example to utilising solar energy, and in some embodiments that can simultaneously condense the water content of any product gas flow.

Adsorption Apparatus

The water desorption arrangement can take any number of forms. In embodiments, temperature swing adsorption is undertaken to achieve water harvesting. This can be achieved using direct heating methods, or in some cases using magnetic induction swing adsorption.

Magnetic Swing Water Adsorption Apparatus

In some cases, the apparatus can be configured as a magnetic swing water adsorption apparatus to harvest a water content from a water containing gas, such as atmospheric air. One form of this type of apparatus 200 is illustrated in FIG. 1A or 1B.

Figure 1A:
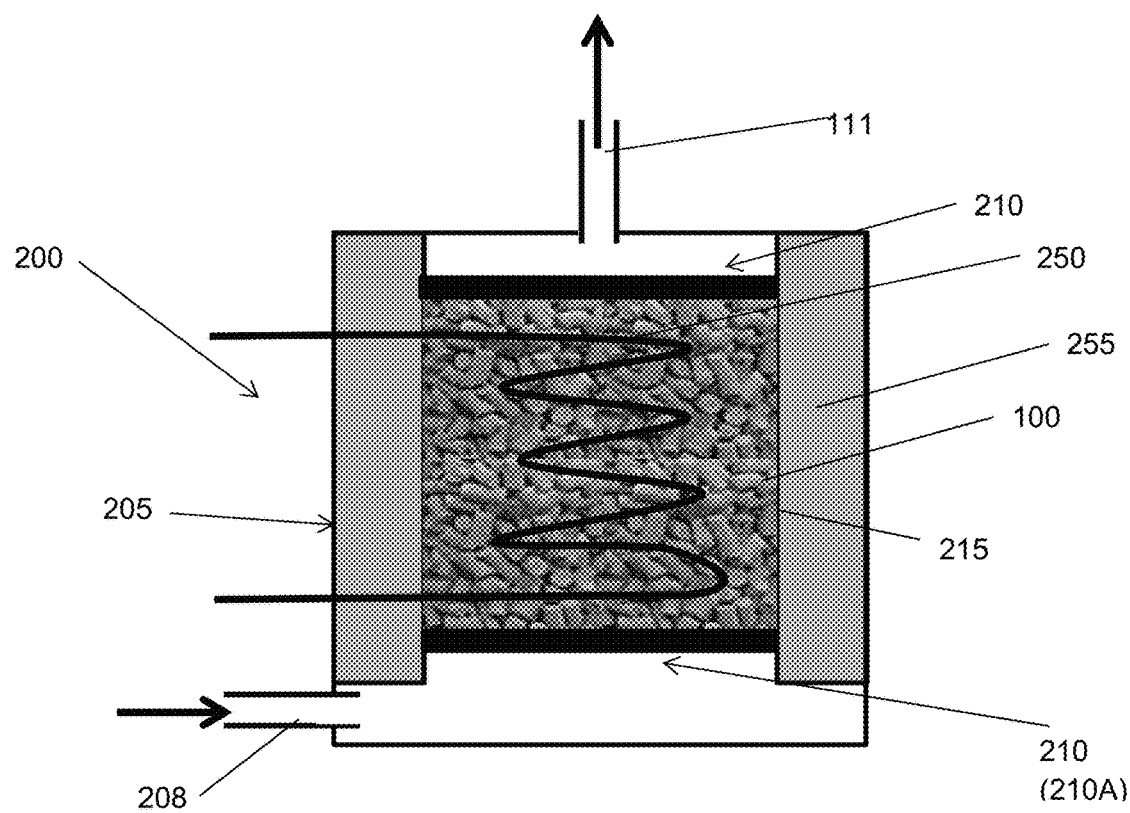
FIG. 1A is a schematic of a magnetic induction swing apparatus for capturing a water content from a water containing gas according to one embodiment of the present invention.
Figure 1B:
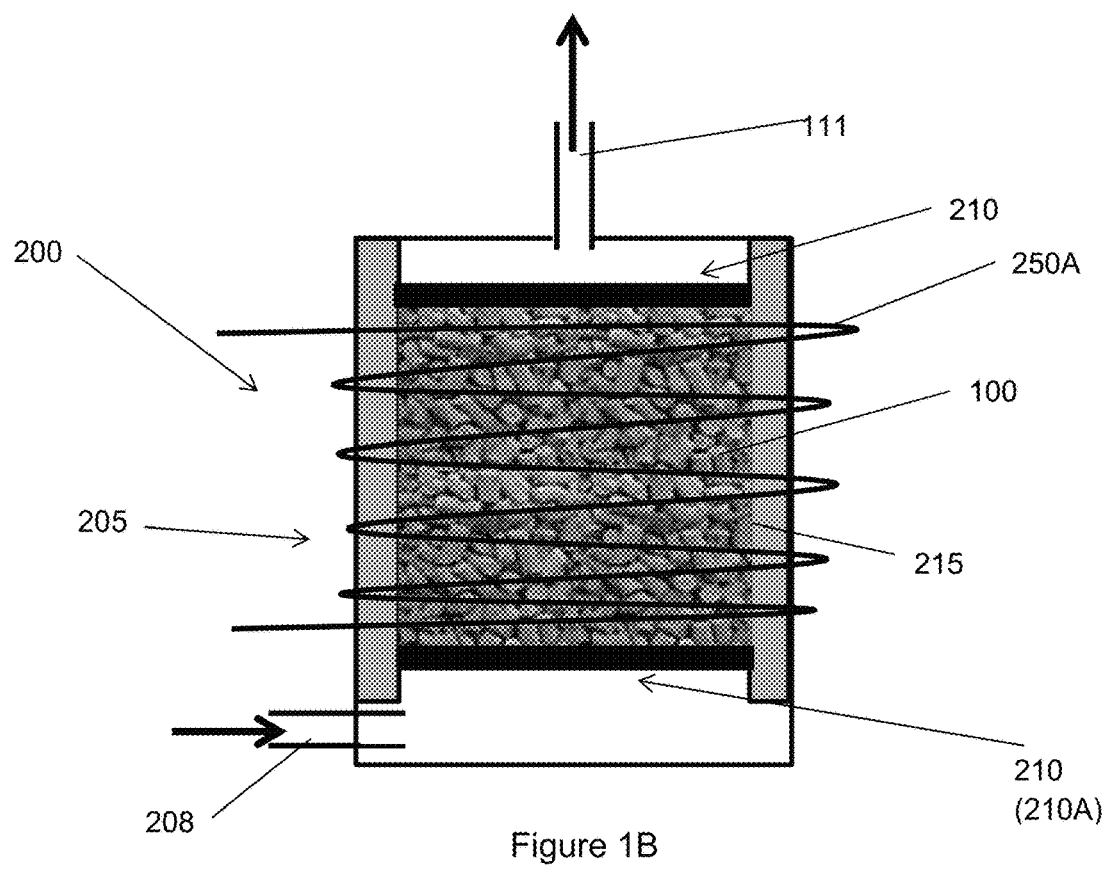
FIG. 1B is a schematic of a magnetic induction swing apparatus for capturing a water content from a water containing gas according to another embodiment of the present invention.

FIGS. 1A and 1B illustrate an apparatus 200 for capturing a water content from a water containing gas that uses a shaped water adsorbent composite body formulated with magnetic particles as discussed above. The apparatus 200 comprises a cylindrical housing 205 which includes inlet 208 and outlet 211. Housing 205 contains a packed bed 215 of shaped water adsorbent composite bodies 100 (see FIG. 2C), the composition of which is described in more detail below. A fluid distributor disc 210 proximate the base and lid/top of the housing 205 is used to retain the shaped adsorption material 215 between the discs 205. Each fluid distributor disc 210 comprises a metal disc with multiple holes drilled therethrough to allow fluid to flow through the packed shaped adsorption material. The shaped adsorption material forms a compressed packed bed between the discs 210, and are compressed therebetween so that the adsorbent shaped bodies 100 are tightly packed therein, thereby avoiding any flow short circuiting.

Figure 2C:
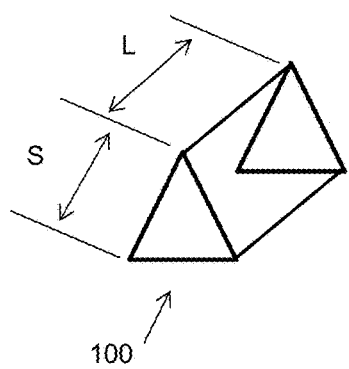
FIG. 2C provides a schematic diagram of a shaped adsorption body according to one embodiment of the present invention utilised in the packed bed of the apparatus shown in FIGS. 1A to 1B.

In the embodiment shown in FIG. 1A, an alternating current (AC) induction coil 250 is located within and surrounded by the packed bed 215 of shaped water adsorbent composite bodies 100 (FIG. 2C). The induction coil 250 is configured to apply an AC magnetic field to the packed bed 215 of shaped water adsorbent composite bodies. The induction coil 250 is embedded within the packed bed 215 to optimise the use of the applied magnetic field when the induction coil 250 is operated.

The housing 205 includes magnetic dampening material 255 to reduce magnetic field leakage from the container to the surroundings. This can be important in some applications where a magnetic field could deliriously affect the operation of proximate equipment, or irradiate people or objects.

In the embodiment shown in FIG. 1B, an alternating current (AC) induction coil 250 is located external of the housing 205, but in a location around the housing which extends around the packed bed 215 of shaped water adsorbent composite bodies 100. Again, the induction coil 250 is configured to apply an AC magnetic field to the packed bed 215 of shaped water adsorbent composite bodies. However, it should be appreciated that the positioning of this induction coil 250 is not as energy efficient as shown in FIG. 1A due to losses through the material of housing. Furthermore, whilst not shown in FIG. 1B, a further housing may be used to enclose the induction coil which includes magnetic dampening material 255 to reduce magnetic field leakage to the surroundings.

In use, a water containing gas is flowed through the packed bed of shaped bodies 215 such that the shaped water adsorbent composite bodies adsorb water from the water containing gas. Once the packed bed 215 reaches a desired saturation (typically 70 to 90% saturation point), the induction coil 250 is operated to apply an alternating current magnetic field thereby generating heat within the shaped water adsorbent composite bodies, so to release at least a portion of the adsorbed water therefrom into a product fluid flow. The shaped water adsorbent composite bodies therefore undergo magnetic induction vacuum swing adsorption to capture water from the water containing gas fed into the packed bed of shaped water adsorbent composite bodies 215.

Whilst not shown in FIG. 1A or 1B, a condenser can be used to subsequently separate the water content of the product fluid flow (typically gas with entrained water vapour) to produce a captured water product. A low or reduced pressure (sometimes referred to as a vacuum environment), or a positive pressure gas flow, for example a flow of the water containing gas or another gas such as an inert or other dry gas, to direct the released water to the condenser.

The above described method is cyclically applied, where the steps of adsorbing water in the shaped water adsorbent composite bodies 100, releasing that adsorbed water through application of the AC magnetic field and condensing that water is conducted in a repetitive cycle so to continuously produce water.

Adsorption Medium

The apparatus illustrated in FIGS. 1A to 1E each use a shaped water adsorbent composite body 100 (FIG. 2C) in a packed bed as the water adsorbent. However, it should be appreciated that the metal organic framework composite can be provided in an apparatus of the present invention in any form suitable to the particular apparatus configuration. The inventors envisage that this may be in any number of composite forms including (but not limited to) shaped bodies (for example pellets or extrusions), coatings, plates, sheets, strips or the like.

Shaped Metal Organic Framework Composite Body

The shaped water adsorbent composite body 100 (FIG. 2C) used in the apparatus discussed in relation to the apparatus shown in FIGS. 1A to 1E comprises a mixture of water adsorbent metal organic framework (MOF), and a hydrophilic binder which is optimised for use in a packed bed adsorption system. That mixture is composed of at least 50 wt % water adsorbent metal organic framework and at least 0.1 wt % hydrophilic binder.

In the embodiments shown in FIGS. 1A and 1B, the shaped water adsorbent composite body 100 is configured to harvest water using a magnetic induction swing adsorption system. In these embodiments, the shaped water adsorbent composite body additionally contains from 0.2 to 10 wt % magnetic particles having a mean particle diameter of less than 200 nm. The use of magnetic particles in the composition forms enables inductive heat generation to be used for water desorption. This type of composite, known as a magnetic framework composite, combines the exceptional adsorption performance of MOFs and the high efficiency of magnetic induction heating.

The metal organic framework composite material can be shaped into any suitable configuration for use in a packed adsorption system. In the present invention, the metal organic framework composite material is exemplified as a elongate shaped water adsorbent composite body 100 having a triangular cross-section, for example as shown in FIG. 2C. However, it should be appreciated that other shapes for example spherical, cylindrical, cubic, ovoid or the like could equally be used.

Referring to FIG. 2C, the shaped water adsorbent composite body 100 comprises an elongate body having an equilateral triangle cross-sectional shape. The sides S of the equilateral triangle are at least 1 mm in length, preferably between 1.0 and 1.5 mm in length. The shaped water adsorbent composite body is preferably from 1 to 5 mm in length (longitudinal length, L), more preferably 1 to 4 mm in length. The elongated triangular shape is selected to increase packing density of the shaped water adsorbent composite bodies 100 within a packed bed (for example packed bed 215 shown in FIGS. 1A and 1B). Previous studies have shown that this shape has one of the highest packing densities in packed bed configurations. A high packing density is preferred for optimum utilisation and heat generation from an applied heat source. For example, a cylindrical pellet shape has a packing density of around 0.19 kg/L. An elongated equilateral triangular shaped pellet has a packing density of around 0.29 kg/L.

Water Adsorbent Metal Organic Framework

The water adsorbent metal organic framework used in the shaped water adsorbent composite body 100 can be selected from a range of suitable water adsorbent MOFs. A wide variety of water adsorbent MOFs are known, for example as discussed in Furukawa et al "Water Adsorption in Porous Metal-Organic Frameworks and Related Materials" Journal of the American Chemical Society 136(11), March 2014 and H W B Teo and A Chakraborty 2017 IOP Conf. Ser.: Mater. Sci. Eng. 272 012019 the contents of which should be understood to be incorporated into this specification by these references. In selected embodiments, the water adsorbent metal organic framework comprises at least one of aluminium fumarate, MOF-303 (Al), MOF-573 (Al), MOF-801 ($Zr_6O_4(OH)_4$(fumarate)$_6$), MOF-841 ($Zr_6O_4(OH)_4(MTB)_2$ $(HCOO)_4(H_2O)_4$), $M_2Cl_2BTDD$ (including $Co_2Cl_2BTDD$), Cr-soc-MOF-1, MIL-101(Cr), CAU-10, alkali metal (Li+, Na+) doped MIL-101(Cr), MOF-802 ($Zr_6O_4(OH)_4(PZDC)_5$ $(HCOO)_2(H_2O)_2$), MOF-805 ($Zr_6O_4(OH)_4$[NDC—$(OH)_2]_6$), MOF-806 ($Zr_6O_4(OH)_4$[NDC—$(OH)_2]_6$), MOF-808 ($Zr_6O_4(OH)_4(BTC)_2(HCOO)_6$), MOF-812 ($Zr_6O_4$ $(OH)_4 (MTB)_3(H_2O)_4$) or a mixture thereof. Preferred water adsorbent metal organic frameworks are aluminium fumarate, MOF-303 (Al), MOF-801, MOF-841, $M_2Cl_2BTDD$, Cr-soc-MOF-1, and MIL-101(Cr).

Optimising the selection of a water adsorbing MOF involves a number considerations, including:
1. Water stability—the MOF should be water stable.
2. Adsorption reproducibility, the MOF should retain adsorption capacity after multiple adsorption/desorption cycles, preferably at least 10 cycles, more preferably at least 100 cycles.
3. Ease of production, the MOF should be easy to produce from readily available precursor materials.
4. High water uptake from air even at low humidity values.
5. A good affinity for water. The MOF should have a good enough affinity for water to enable the MOF to adsorb the water, but not have too high affinity for water that excessive energy needs to be expended to desorb water therefrom. Here the thermodynamics of water adsorption and desorption need consideration to ensure the MOF does not require excessive energy (kJ/mol MOF) to desorb water therefrom, and thereby adversely affect the energy efficiency of the system. Typical heats of adsorption for water for the MOF range from 10 to 100 kJ/mol MOF for water adsorbed on the MOF (550 to 5500 kJ/kg). Careful MOF selection is important to the operation of the device as the cost of the water will be directly linked to the energy required to desorb the water from the MOF.

Where the MOF is required for water production for human consumption, the MOF and other materials must also meet food for human consumption regulations in relevant countries. The Applicant has found that the water adsorbent MOF preferably comprises aluminium fumarate (AlFu) MOF in these embodiments. The water adsorption properties of AlFu are published in a number of research studies available in the published literature.

Aluminium Fumarate

Aluminium fumarate (AlFu) is used as a preferred MOF in the shaped water adsorbent composite body 100. The structure and water adsorption properties of AlFu are well known, for example as detailed in Teo et al. (2017). Experimental study of isotherms and kinetics for adsorption of water on Aluminium Fumarate. International Journal of Heat and Mass Transfer Volume 114, November 2017, Pages 621-627, the contents of which are to be understood to be incorporated into this specification by this reference. As outlined in Teo, the crystal structure of AlFu resembles MIL-53 as it also consists of infinite Al OH Al chains connected by fumarate linkers. AlFu has a permanently porous 3D structure of formula $[Al(OH)(O_2C—CH=CH—OO_2)]$ with square channels.

Overall, aluminium fumarate was selected as a preferred choice of MOF for the inventive water capturing apparatus and system due to:

1. Ease of manufacture—this MOF can be synthesised in water. Following synthesis, processing the MOF is simple as outlined in the Examples.
2. Good thermal stability and is highly water stable (unlike many other MOFs);
3. It is robust to handling in ambient conditions and can withstand multiple temperature cycles without degradation.
4. It has a well-studied water adsorption behaviour;
5. High water uptake from air even at low humidity values; Aluminium fumarate has a water capacity between 0.09 to 0.5 grams of water per gram of MOF depending on the relative humidity. The typical heat of adsorption of Aluminium fumarate for water is well known and ranges between 60 and 30 kJ/mol depending on the ambient humidity
6. It can be cheaply and easily produced using non-toxic constituents/precursor material—i.e. environmentally friendly synthesis and is easy to handle and process; and
7. Low cost of its constituents.

Nevertheless, it should be appreciated that the MOF component of the present invention is not restricted to Aluminium fumarate, and that other water adsorbent MOFs can also be used in the composition of the water adsorbent composite body.

Hydrophilic Binder

The selection of the appropriate binder is also important to the overall properties of the shaped adsorption body. The inventors have surprisingly found that a hydrophilic binder must be used to impart optimal water adsorption properties to the shaped water adsorbent composite bodies. The inventors have also found that non-hydrophilic binders and in particular hydrophobic binders (for example cellulose siloxane) reduce/decrease the water adsorption properties of the shaped water adsorbent composite bodies. The use of a hydrophilic binder is therefore important for optimal moisture capture properties of the packed bed water adsorption system. However whilst other binders are also possible, it is again noted that particularly suitable hydrophilic binders can be selected from at least one of hydrophilic cellulose derivatives such as hydroxypropyl cellulose, hydroxyethyl methyl cellulose, hydroxypropyl methyl cellulose (HPMC), ethyl hydroxyethyl cellulose, methyl cellulose, or carboxymethyl cellulose (CMC) as previously set out in this specification.

As indicated in the following examples, one exemplary hydrophilic binder is hydroxypropyl cellulose (HPC).

Lubricant

The shaped water adsorbent composite body can further comprise a lubricant content, preferably less than 0.5 wt % lubricant, and more preferably less than 0.1 wt % lubricant. Suitable lubricants include surfactants and their salts. Examples of suitable lubricants include magnesium stearate, aluminium oxide, sodium oleate, glycerides, di-glycerides, tri-glycerides, fatty acids, oils including silicon oils and mineral oils and mixtures thereof. As mentioned previously, the lubricant content can assist with the shaping and forming processes of the shaped water adsorbent composite body.

Magnetic Particles

The shaped water adsorbent composite bodies can be configured to harvest water using a magnetic induction swing adsorption system. In these embodiments, the shaped water adsorbent composite body 100 (FIG. 2C) comprises a mixture composed of at least 50 wt % water adsorbent metal organic framework, at least 0.1 wt % hydrophilic binder and from 0.2 to 10 wt % magnetic particles having a mean particle diameter of less than 200 nm. The mixture is optimised for use in a packed bed adsorption system.

As discussed previously, a wide variety of magnetic particles can be used in the inventive shaped adsorption body. In embodiments, the magnetic particles comprise a ferromagnetic, paramagnetic, or superparamagnetic particles (typically micro or nano-particle). In embodiments, the magnetic particles comprise metal chalcogenides. Suitable metal chalcogenides comprise magnetic particles comprising any combination of element or ionic form thereof M selected from at least one of Li, Na, K, Rb, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, Si, Ge, Sn, Pb, As, Sb, Bi, or their combinations, in combination with elements or elemental form of at least one of O, S, Se, or Te. In some embodiments, the crystallisation facilitators comprise metal chalcogenide having the formula $M_xN_yC_z$, where M, N are selected from at least one of Li, Na, K, Rb, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, Si, Ge, Sn, Pb, As, Sb, Bi, C is selected from at least one of O, S, Se, Te, x is any number from 0 to 10, y is any number from 0 to 10 and z is any number from 0 to 10. The metal chalcogenide particles may in some embodiments have a core-shell structure in which the core comprises at least one metal chalcogenide as previously described and the shell comprises at least one metal chalcogenide as previously described. In some forms, the core-shell structure may include multiple shells. In embodiments, the magnetic particles comprise at least one of $MgFe_2O_4$, $Fe_3O_4$, C-coated Co, $CoFe_2O_4$, $NiFe_2O_4$, Pyridine-2,6-diamine-functionalized $SiO_2$, or Pyridine-2,6-diamine-functionalized $Fe_3O_4$.

The advantages of these magnetic materials are:
Local heat generation—i.e. heat can be generated insitu the material by applying an AC magnetic field (as discussed previously) as opposed to using an external heating source;
Fast heating of material, due to local heat generation avoiding thermal and energy loss through thermal heating of surrounding materials; and
High energy conversion efficiency The combination of the magnetic particles with MOFs to form a magnetic framework composite material yields an adsorbent with exceptional adsorption behaviour as a result of the MOFs and high efficiency of induction heating as a result of the magnetic particles.

EXAMPLES

The following examples use AlFu as the water adsorbent MOF in the magnetic framework composite material. It should be appreciated that the magnetic framework composite material could use any number of other water adsorbent MOFs through direct substitution of that MOF within the magnetic framework composite material pellets.

Example 1—Magnetic Induction Swing Water Harvesting

1. Magnetic Framework Composite Material

The synthesis of AlFu and the preparation of shaped water adsorbent composite bodies comprising AlFu magnetic framework composite material (MFC), hereafter referred to as MFC pellets, are described. The examples demonstrate that the experimental system can produce water repeatedly, with 1.2 grams of water having been produced from roughly 3 cycles of the described method and system. Cycle times were approximately 30 minutes in duration. In the examples outlined below, 0.4 g of water was captured using 5 g of the inventive shaped composite material within 28 minutes. This provides the following production and energy use:

Anticipated water production capacity: 4.3 L/kg of MOF a day with a cycle time of 28 mins; and
Anticipated energy use: 12 kWh/L.

As a comparison, the system described in Yaghi 1 and Yaghi 2 (referred to in the Background of the Invention section) uses sunlight as energy source for regeneration of the MOF. This device was reported as being capable of capturing 2.8 litres of water per kilogram of MOF daily at relative humidity levels as low as 20% at 35° C. in Yaghi 1. Yaghi 2 indicates that about 0.75 g of water was produced from 3 g of MOF within 16.5 hours in the same conditions. This equates to an anticipated water production capacity of 0.25 L/kg of MOF daily. The process of the present invention therefore has a significantly higher water production rate than the system taught in Yaghi.

The inventors note that Yaghi 1 originally claimed that their device was capable of capturing 2.8 litres of water per kilogram of MOF daily at relative humidity levels as low as 20% at 35° C. However, this higher production rate appears to have been greatly overestimated in that paper, as further experimental work published in Yaghi 2 using the same set up reports a production rate being an order of magnitude lower at 0.25 litres of water per kilogram of MOF daily at 20% RH and 35° C. Inventors consider that the production rate published in Yaghi 2 reflects the actual production rate of this MOF-801 based system.

1.1 Preparation of Magnetic Framework Composites

The synthesis of aluminium fumarate MOF and the preparation of aluminium fumarate MFC pellets are described.

1.1.1 Aluminium Fumarate Synthesis

Figure 6:
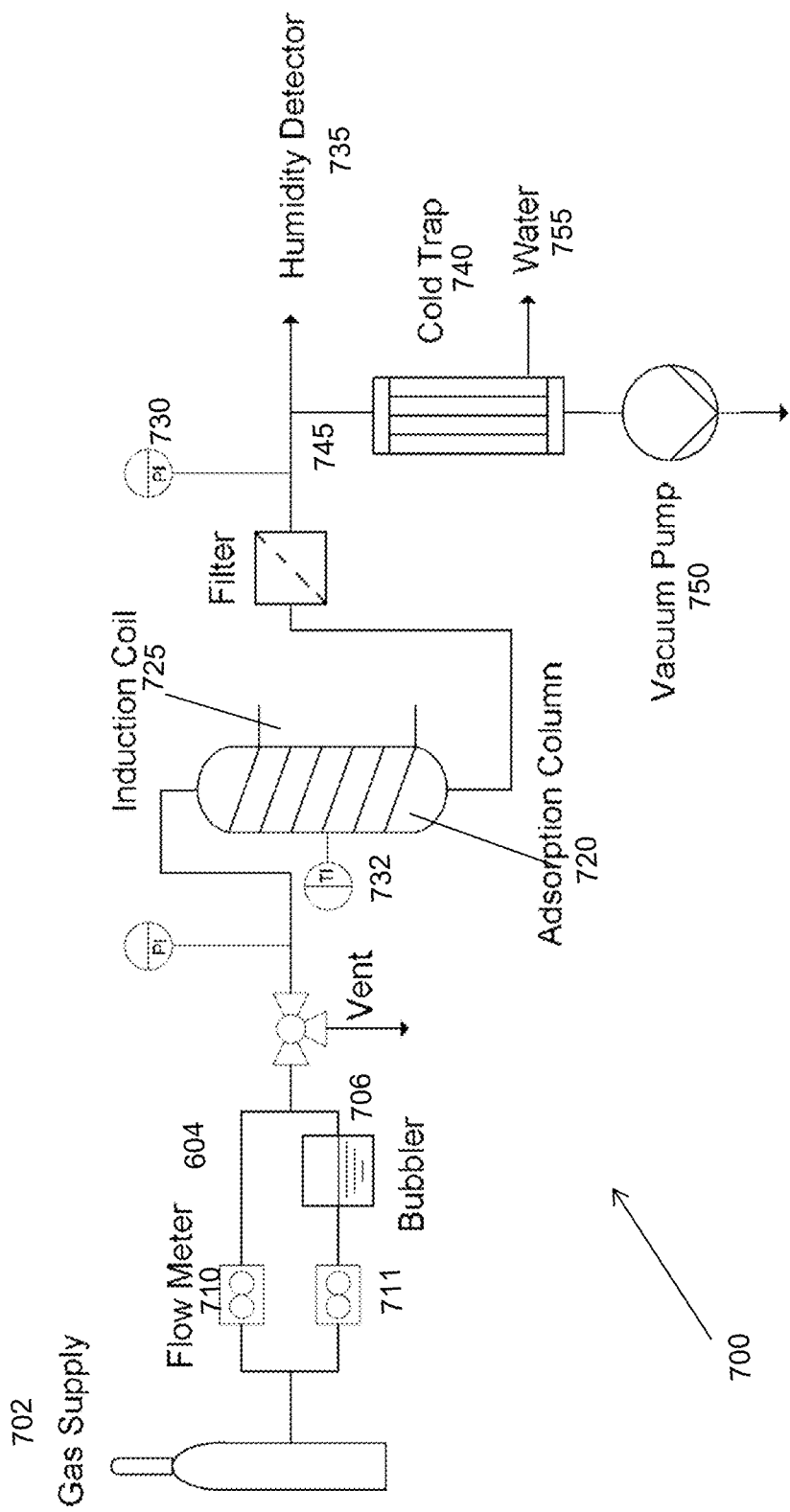
FIG. 6 is a schematic of the experimental magnetic induction swing water capturing rig.

Within this work, two different scaled batches of aluminium fumarate were synthesized. For the evaluation of different contents of magnetic nanoparticles on moisture adsorption and induction heating performance of the composite material a smaller batch, designated Batch I, was prepared. While for experiments with the water capture rig 600 (see FIG. 6), a larger batch, designated Batch II, was synthesized.

Figure 2A:
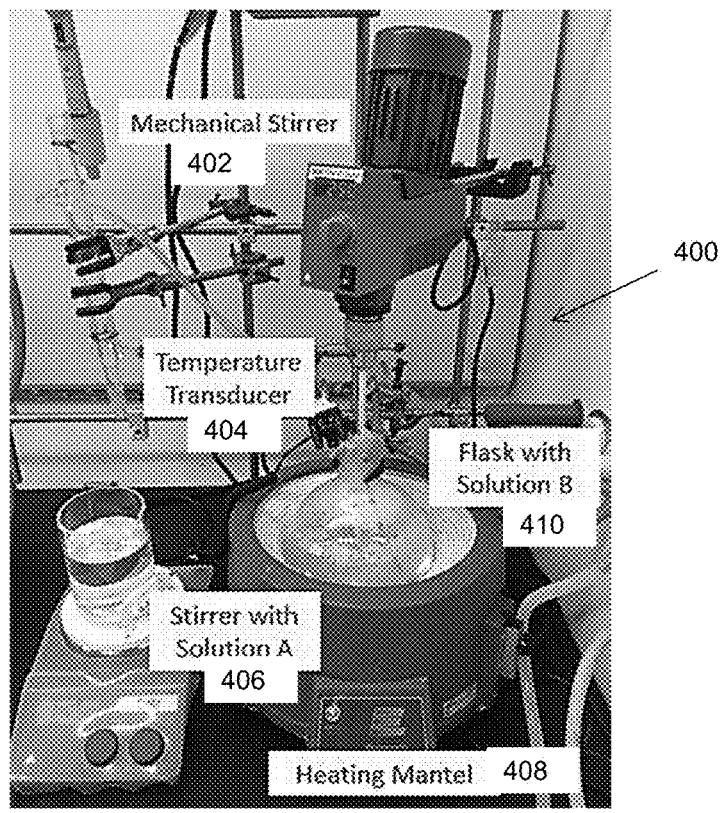
FIG. 2A is a photograph of the experimental setup used for aluminium fumarate synthesis.

The experimental setup 400 of the aluminium fumarate synthesis reaction is presented in FIG. 2A.

The two precursor solutions named A and B were synthesized as follows:

For solution A, aluminium sulfate octadecahydrate was dissolved in deionized water using a magnetic stirrer 406. Precursor solution B was prepared by dissolving sodium hydroxide pellets and fumaric acid with a purity of 99% in deionized water under stirring with a magnetic stirrer (not shown). The composition of both solutions can be taken from Table 1.

TABLE 1

| | Composition of precursor solutions for aluminium fumarate synthesis | | | | |
|---|---|---|---|---|---|
| | Precursor Solution A | | Precursor Solution B | | |
| | Aluminium Sulfate | Deionized Water | Sodium Hydroxide | Fumaric Acid | Deionized Water |
| Batch I | 35 g | 150 ml | 13.35 g | 12.9 g | 191 ml |
| Batch II | 90 g | 385.7 ml | 34.33 g | 33.17 g | 491.1 ml |

Solution B was then filled into a round bottom flask 410 and heated up to 60° C. using a heating mantel 408. A mechanical stirrer 402 was used to stir the liquid. When 60° C. were reached, precursor solution A was added. The mixture was then stirred for 20 minutes at 60° C. measured using temperature transducer 404.

Afterwards, the suspension was filled into centrifuge tubes (not shown) and centrifuged for 8 to 10 minutes at 6000 rpm for Batch I and 4500 rpm for Batch II, respectively. The liquid was then removed from the sedimented MOF crystals. After that aluminium fumarate was washed using the following procedure. At first, deionized water was added to the MOF crystals. The suspension was then shaken by hand until the sediments were homogenously mixed up. Furthermore, the suspension was mixed for 15 minutes onto a roller mixer for Batch I and an orbital shaker for Batch II, respectively. Afterwards, the suspension was centrifuged using the same settings as mentioned before. After removing the liquid, the washing procedure with deionized water was repeated for another three times.

Figure 2B:
FIG. 2B is a photograph of the produced aluminium fumarate after washing procedure.

Subsequently, aluminium fumarate was washed with methanol for one time following the same procedure as described before. Aluminium fumarate after the washing procedure is shown in FIG. 2B.

After the washing steps, the MOF crystals were pre-dried overnight in a glove bag under nitrogen atmosphere. Afterwards, the MOF was dried overnight in an oven at 100° C. under nitrogen atmosphere. Subsequently, the temperature was increased to 130° C. and the oven was evacuated to activate the MOF for 6 to 8 hours.

1.1.2 Aluminium Fumarate Composite-Pellet Preparation

A smooth paste needs to be prepared for the extrusion of MOF pellets. Therefore, the MOF was ground using a mortar and a pastel (not illustrated) for the smaller Batch I and a coffee grinder (not illustrated) for the larger Batch II, respectively. After grinding, the MOF was sieved through a 212 μm sieve. In case of Batch II, the aluminium fumarate powder was sieved through a 150 μm sieve. The MOF powder was then weighed into a jar. Afterwards, magnetic nanoparticles (MNPs) were added. In this work, magnesium ferrite was chosen as magnetic nanoparticles. However, it should be appreciated that other magnetic nanoparticles could equally be used. The powder mixture was then shook by hand for about 10 minutes until the colour of the powder was homogenously brownish. Afterwards, the powder was filled into a bowl and a hydrophilic binder (hydroxypropyl cellulose (HPC)) was added. To investigate the effect of the amount of magnetic nanoparticles on water uptake and magnetic induction heating, different composites were prepared. The composition of the prepared samples is provided in Table 2.

TABLE 2

Composition of different aluminium fumarate composite samples

| Batch | Concentration of Magnesium Ferrite [wt %] | Concentration of Binder [wt %] |
|---|---|---|
| Batch I | 0 | 0 |
|  | 0 | 1 |
|  | 1 | 1 |
|  | 3 | 1 |
|  | 5 | 1 |
| Batch II | 3 | 1 |

Furthermore, a solvent, in this case deionised water was added to make the mixture pastier. In case of Batch I, also small amounts of ethanol were added. The components were then well mixed until an ice cream like paste has formed.

Figure 3A:
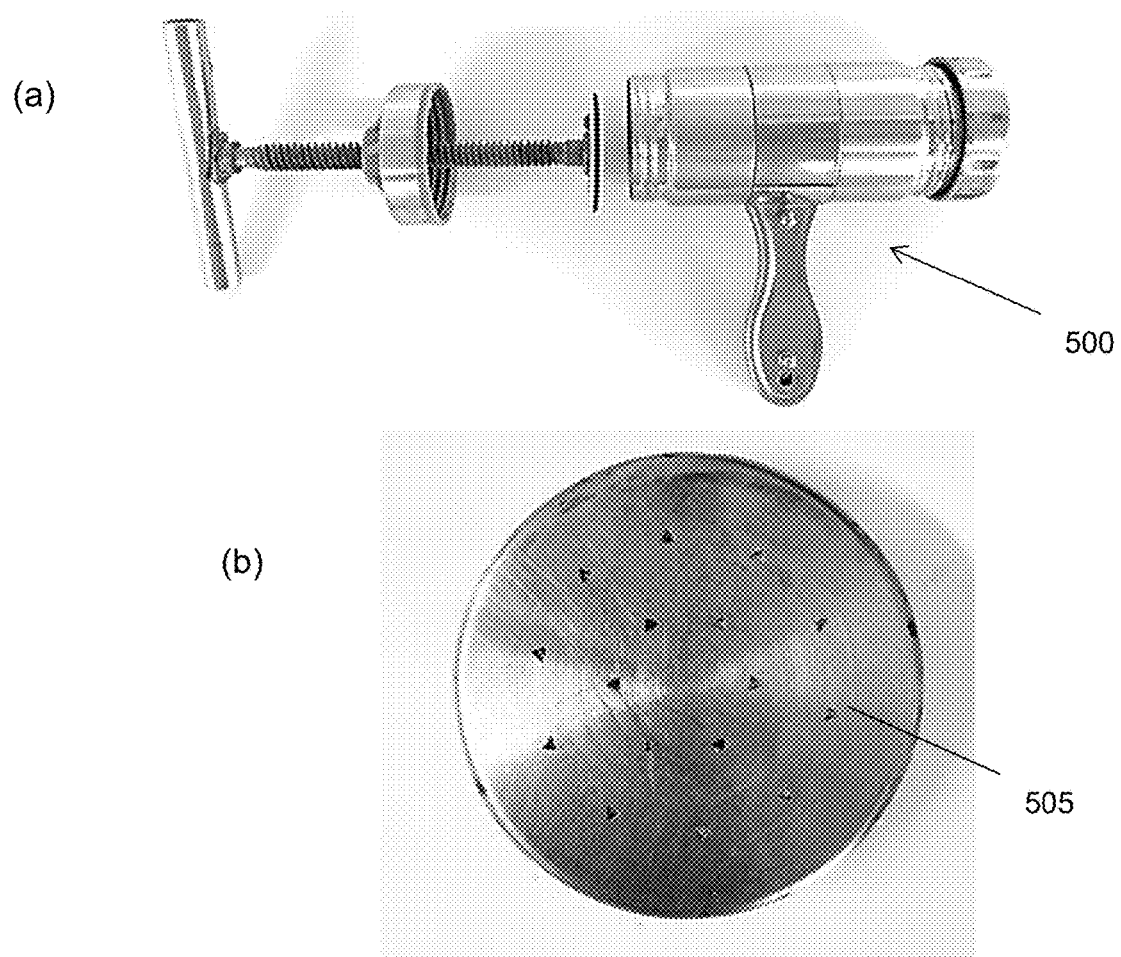
FIG. 3A is photograph of the hand extruder and triangular shaped nozzle used to produce the shaped aluminium fumarate composite pellets.

For the extrusion of composites made from Batch I, a syringe with a round nozzle was used (not illustrated). In case of Batch II, a hand extruder 500 with a triangular shaped nozzle 505 was chosen. The extruder is illustrated in FIG. 3A. The triangular shaped extrusion attachment 505 was chosen in order to increase the packing density of the produced pellets as explained previously. Furthermore, magnesium stearate was used as lubricant for preparation of pellets from Batch II. The magnesium stearate powder was greased onto the inner walls of the hand extruder 500. The paste was extruded onto filter paper and dried for at least 10 minutes. Afterwards, the extruded MOF was cut into 3 to 5 mm long pellets using a razor blade.

Figure 3B:
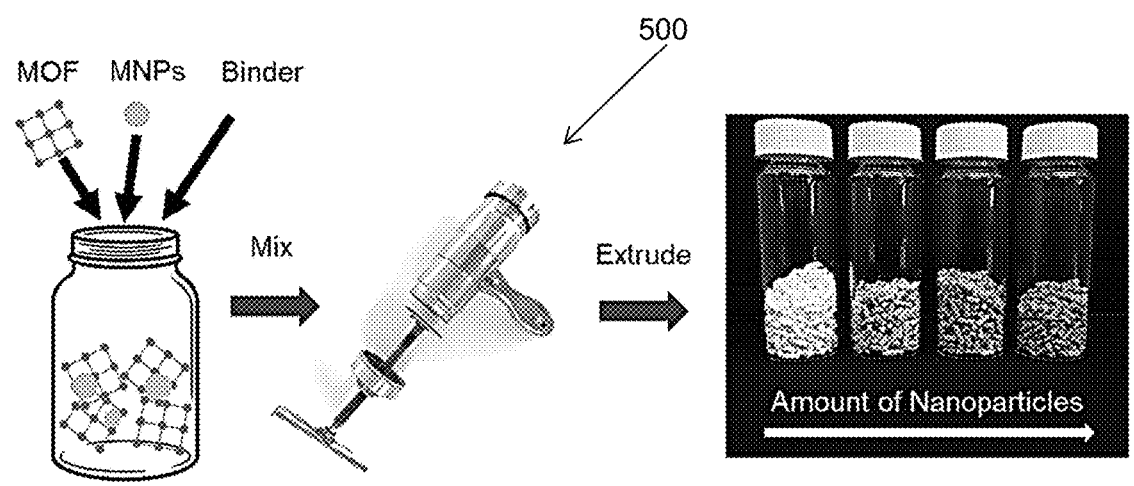
FIG. 3B provides a schematic diagram of the pellet forming process.
Figure 4:
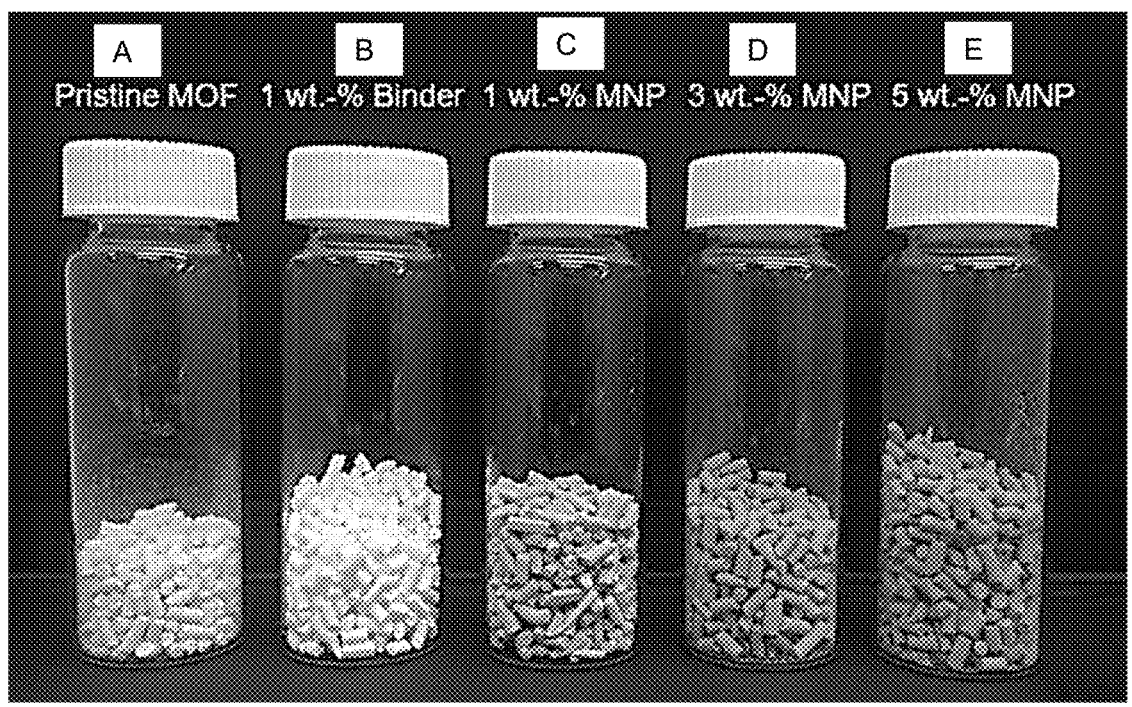
FIG. 4 is a photograph showing the produced aluminium fumarate and aluminium fumarate composite pellets, being (A) Pristine MOF; (B) 1 wt % binder; (C) 1 wt % MNP; (D) 3 wt % MNP; and (E) 5 wt % MNP.

The pellets were then dried in an oven at 100° C. under vacuum (reduced pressure of less than 100 mbar) for 24 hours. The different MOF composite pellets (Aluminium fumarate and aluminium fumarate composite pellets) are presented in FIG. 4 which show (A) Pristine MOF; (B) 1 wt % binder; (C) 1 wt % MNP; (D) 3 wt % MNP; and (E) 5 wt % MNP. A schematic of this overall process is shown in FIG. 3B.

1.2 Analysis of Aluminium Fumarate Composites

The first part of this section deals with different analysis methods that have been used to characterize the structure of aluminium fumarate composites. Furthermore, methods that evaluate the performance of the composites regarding water uptake and magnetic induction heating are described.

1.2.1 X-Ray Diffraction

All samples have been characterized using powder X-ray diffraction (PXRD) as well as small-angle X-ray scattering (SAXS) and wide-angle X-ray scattering (WAXS). For X-ray diffraction analysis, the pellets were ground first to fill them into the sample holder.

Powder X-ray diffraction was performed employing a Bruker D8 Advance X-ray Diffractometer operating under CuKα radiation. The diffractometer was equipped with a Lynx Eye detector. All samples were scanned over the 2θ range 5° to 105° with a step size of 0.02° and a count time of 1.6 seconds per step. To give an equivalent time of 284.8 seconds per step, 178/192 of the sensor strips on the Lynx Eye were used. The Bruker XRD search match program EVA™4.2 was used to perform analyses on the collected PXRD data.

Aluminium Fumarate is not present in the JCPDS database. Therefore, for reference a simulation of the structure of aluminium fumarate was generated in TOPAS using a simplified model for the geometry of the mentioned diffractometer.

Small- and wide-angle X-ray scattering was performed at the Australian Synchrotron. The samples were mounted onto sample holder plates. All samples despite of magnesium ferrite control samples were analysed with 1% Flux and an exposure time of 1 sec. Magnesium ferrite samples were analysed at 100% Flux.

1.2.2 Infrared Spectroscopy

Infrared spectra analysis was performed using a Thermo Scientific Nicolet 6700 FT-IR spectrometer. The samples were analysed in the wavenumber range from 500 to 4000 $cm^{-1}$.

1.2.3 Scanning Electron Microscope Imaging

Specimens for scanning electron microscope (SEM) imaging were prepared by diluting the samples in water and then trickling the suspension onto a silicon waver. The silicon waver was then stuck onto a SEM specimen stub using carbon tape. Before scanning, the samples were coated with iridium to increase the signal to noise ration during microscopy. The SEM images were taken using a Carl Zeiss Gemini SEM 450 instrument at 10000 times magnification.

1.2.4 Surface Area and Porosity Measurements

Surface area and porosity measurements of aluminium fumarate composites were analysed using a Micrometrics ASAP 2420 high throughput analysis system.

At first, composite pellets were filled into pre-weighed analysis tubes and capped with Transeal caps. The samples were then degassed for 24 hours at 140° C. under vacuum. Afterwards, the tubes with the containing degassed samples were weighed to determine the mass of the dried pellets. The tubes were then transferred to the analysis ports of the instrument. Langmuir and Brunauer-Emmett-Teller (BET) surface areas as well as pore size distribution of all samples were determined by collecting nitrogen isotherms at 77K in a liquid nitrogen bath. Pore size distribution was determined using density functional theory (DFT).

The BET surface area of samples made from batch I was measured three times in order to determine the variation within the analysis. The averaged surface area $\bar{x}$ was calculated using Equation 1.1:

$$\bar{x} = \frac{1}{n}\sum_i^n x_i \tag{1.1}$$

Where n is the total number of experiments and xi is the surface area of the experiment i.

Furthermore, the standard deviation $s_n$ was calculated. This was done by using Equation 1.2.

$$s_n = \sqrt{\frac{1}{n}\sum_i^n (\bar{x} - x_i)^2} \tag{1.2}$$

1.2.5 Water Uptake Capacity Determination

Water Uptake capacity was measured using a Quantachrome Instruments Autosorb-1 analyser.

The samples were filled into pre-weighed analysis tubes. After that, the material was degassed for 16 hours at 140° C. under vacuum. Afterwards, the weight of the dried pellets was determined. The tubes were then connected to the analysis port for water vapour adsorption measurement. In order to ensure a constant temperature during the analysis, the sample tubes were put into a water bath at room temperature. Water vapour uptake was measured using pure water vapour at relative pressures $p/p_0$ from 0.1 to 0.5 with a step size of 0.1. The water vapour adsorption experiments have only been performed once because it takes almost one week to run a single isotherm.

1.2.6 Investigation of Magnetic Induction Heating

To evaluate magnetic induction heating of magnetic framework composites, heating rate and efficiency of induction heating have been investigated.

For the induction heating experiments an Ambrell Easy Heat 1.2 kW induction unit was used. The induction coil 560 that was attached to the work head is made from copper. It had three turns, an inner diameter of 4 cm and a length of 2.5 cm. A water chiller 562 was used to cool down the coil 560 during the experiment.

Figure 5:
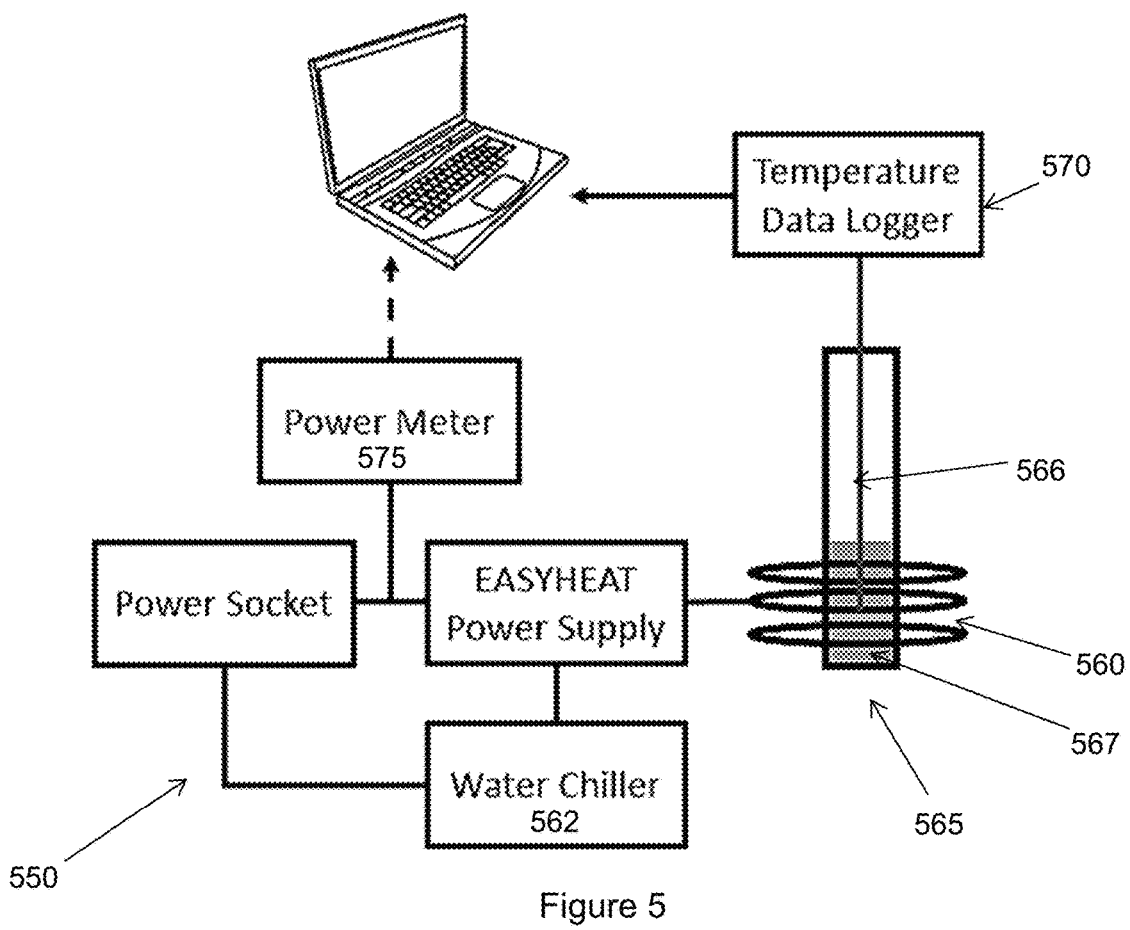
FIG. 5 is a schematic of the experimental setup used for induction heating experiments.

The setup 550 for the induction heating and efficiency experiments is shown in FIG. 5. A certain amount of the sample was filled into a glass vial 565. To monitor the temperature increase of the sample over time during induction heating a fibre optic cable sensor 566 was introduced into the centre of the bed 567. The sensor 566 was connected to an OpSens FOTS100 temperature data logger 570. The glass vial 565 was put into the centre of the coil 560 so that the middle of the bed's height was in line with the middle of the coil's height.

To monitor the energy that is consumed by the induction heating unit during the experiment a Cabac Power-Mate™ power meter 575 was used. The power that is needed to heat up the sample was calculated as following.

At first, the coil was operated without any sample in the magnetic field to get a baseline. Therefore, the energy was measured for 5 minutes. The power was then calculated using Equation 1.3.

$$\text{Power consumed} = \frac{\text{Energy consumed over 5 minutes [kWh]}}{\text{Time (5 minutes) [h]}} \quad (1.3)$$

During heating of the sample, energy was also measured for the first 5 minutes of induction heating. The power was then calculated the same way as mentioned before.

For investigating the heating effect of magnetic framework composites exposed to an external magnetic field, temperature of the sample was measured over time for different composites and for different amounts of the composite pellets. All experiments were performed for more than 20 minutes. After this time the heating curve for induction heating was constant for all samples.

The initial heating rate was used to quantify the induction heating effect. This rate was determined by calculating the linear slope of the temperature profile $(dT/dt)t=0$ at the beginning of the experiment. The heating curve is therefore approximated by Equation 1.4:

$$T(t) = T_0 + \Delta T_{max}\left[1 - e^{\frac{t}{\tau}}\right] \quad (1.4)$$

Where $T_0$ is the initial temperature of the pellets, $\Delta T_{max}$ is the saturation temperature increase $(T_{max}-T_0)$ and $\tau$ is the time constant of heating which corresponds to the time when the temperature reaches approximately 63% of $\Delta T_{max}$.

Efficiency of induction heating of magnetic framework composites was quantified using Equation 1.5.

$$\text{Efficiency \%} = \frac{P_{Coil}}{P_{SAR}} \times 100\% \quad (1.5)$$

In this equation, $P_{Coil}$ is the power that is consumed by the coil during induction heating and it is calculated by using Equation 1.6.

$$P_{Coil} = P_{consumed,heating\ MFC} - P_{consumed,\ without\ MFC\ in\ field} \quad (1.6)$$

The specific adsorption rate (SAR) is usually used to estimate the heating effect of magnetic nanoparticles exposed to an external magnetic field. The SAR was determined by dispersing 10 mg of magnetic nanoparticles in 100 ml of deionized water. The suspension was then put into the centre of the induction coil and triggered with a magnetic field. The temperature increase of the suspension was measured using an optic fibre cable and a temperature data logger. The specific adsorption rate can then be calculated using Equation 1.7.

$$SAR = C_{water} \times \frac{m_{water}}{m_{nanoparticles}} \times \left(\frac{dT}{dt}\right)_{t=0} \quad (1.7)$$

In this equation, $C_{water}$ is the specific heat capacity of water, water $m_{water}$ is the mass of water, $m_{nanoparticles}$ is the mass of magnetic nanoparticles in the suspension and $(dT/dt)t=0$ is the initial heating rate. The initial gradient of the heating curve was calculated as mentioned before.

Finally, the power that is generated by the magnetic nanoparticles in the composite $P_{SAR}$ can then be calculated using Equation 1.8.

$$P_{SAR} = SAR \times \text{Magnetic nanoparticle content of MFC pellet (g)} \quad (1.8)$$

All experiments for determination of the initial heating rate and efficiency of induction heating were carried out for three times to determine a standard variation.

1.3 Proof of Concept Experiments for Magnetic Induction Vacuum Swing Adsorption

This subsection deals with different methods that have been used to evaluate the performance of a magnetic induction vacuum swing adsorption process for water capture from ambient air. These experiments were carried out with a self-constructed water capturing rig on bench scale. The schematic process flow diagram of the Water capturing rig 700 is provided in FIG. 6.

Moisturized nitrogen was used as test gas for water capture and breakthrough experiments. A nitrogen stream from gas supply 702 at 1 bar was split up into a dry gas stream 704 and a wet gas stream 706 that was moisturized by bubbling it through deionized water in bubbler 708. Flow of each stream were measured using flowmeters 710 and 711. The desired humidity of the feed stream for the adsorption column was reached by setting the ratio of the dry gas stream 704 and the wet gas stream 706.

A vertically orientated adsorption column 720 was used comprising a 1 inch polyether ether ketone tube. A perforated Teflon spacer was glued in the bottom part of the tube to hold the adsorption bed thereon within the tube (not illustrated but enclosed within adsorption column 720). Furthermore, glass wool was used to prevent pellets from falling through the holes of the spacer. The tube was connected to the feed and outlet pipes using stainless steel ultra-Torr vacuum fittings purchased from Swagelok.

In these experiments an Ambrell EasyHeat 3542 LI induction coil 725 with a system power of 4.2 kW was used. A copper coil with 5 turns, an inner diameter of 4 cm and a length of 5 cm was connected to the work head of the induction coil 725. The feed and outlet pressure were monitored using manometers 730. To measure the temperature in the adsorption bed, a fibre optic cable 732 was introduced into the middle of the packed bed and connected to a temperature data logger. A RS 1365 Data logging Humidity-Temperature Meter 735 was used to monitor the humidity of the outlet stream 745 of the adsorption column 720.

For water capture, the out-coming stream 645 was lead through a cold trap 740 containing dry ice to condensate the moisture to produce water 755. A vacuum pump 750 was used to generate the driving force for the desorbed gas stream 745.

1.3.1 Water Collection Experiments

For water collection experiments, aluminium fumarate magnetic framework composite pellets made from batch I containing 3 wt % magnetic nanoparticles were filled into the adsorption column. In order to increase the packing density, the pipe was tapped onto the bench for a few times.

A dry nitrogen stream with different volume flow rates was flown through the packed adsorption column in order to determine the back pressure as a function of the flow rate.

The determined back pressure was then used to calculate the desired relative humidity of the feed stream. For the desired humidity, desert like conditions were chosen. The relative humidity in these areas is about 35% at 35° C. and atmospheric pressure. To simplify the experimental set up, the water uptake experiments in this work were carried out at room temperature. This simplification is justified because the temperature dependence of water vapour uptake on aluminium fumarate in this temperature region is negligible. However, in order to get comparable results, calculations of humidity were based on water content in the desert like air. The dessert like conditions correspond to a water content of 11273 ppmV in a pure nitrogen atmosphere (calculated with Michel Instruments Humidity Calculator—http://www.michell.com/us/calculator/).

Based on this water content, the ratio of the dry and the moisturized gas stream can then be calculated.

For water capturing experiments, MFC pellets were activated by triggering them with an alternating current magnetic field and directing a flow of dry nitrogen stream through the column. Activation of the material was performed until the humidity of the out coming gas stream was zero. It is noted that this activation step was used for experimental date collection purposes only in order to obtain a dry MOF for measurement accuracy. A commercial system would not generally require this activation/drying step to be performed as any preadsorbed moisture in the MOF material in the system would simply be desorbed in the first cycle of operation of the system.

Before charging the MFC pellets with water vapour, volume flow rates of the dry and the moisturized streams were set. The resulting feed stream was first vented to allow the humidification of the gas stream to stabilize. After three minutes, the valve in front of the adsorption column was switched to enable the feed to flow through the column.

During moisture adsorption, the humidity of the outlet stream of the column was measured and noted down every 30 seconds in order to determine breakthrough curves. After the humidity of the vented stream had stabilized, the feed stream was turned off and the valve was closed towards the column.

For regeneration, in a first experiment only humidity was measured during desorption in order to determine the duration of the regeneration step. Therefore, during induction heating, a dry nitrogen stream was lead through the adsorption bed to flush the column.

In order to determine breakthrough curves, the relative humidity that was measured in the outlet stream of the column has been normalized. Therefore, the measured humidity was divided by the humidity of the out coming stream that is reached when the adsorption bed is saturated.

2. Results and Discussion

In this section, results of characterisation and performance analysis of aluminium fumarate composites and its ability for capturing water from ambient air using a magnetic induction vacuum swing adsorption process are presented and discussed.

2.1. Structural Characterisation of Composite Material

Figure 7:
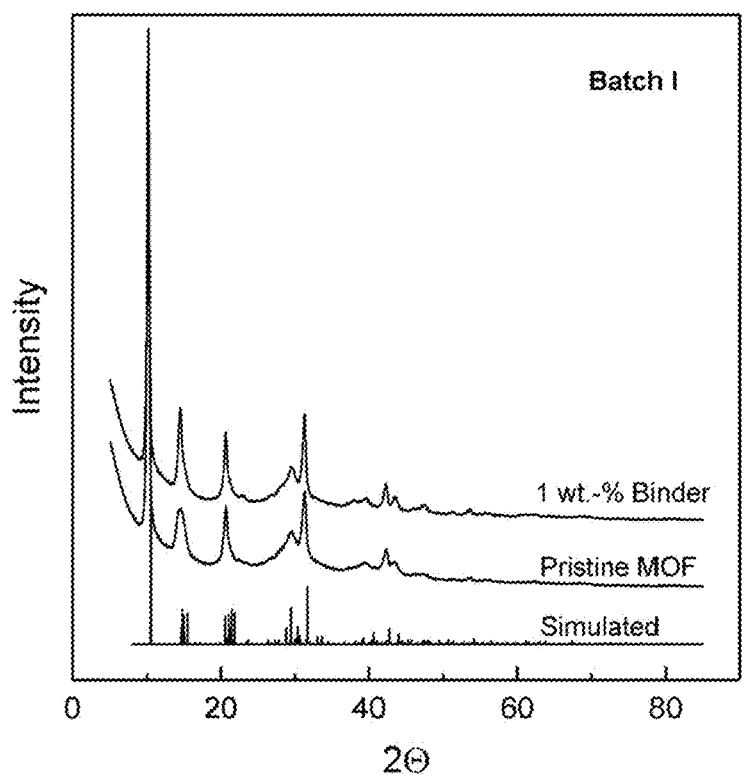
FIG. 7 provides a PXRD pattern of aluminium fumarate, simulated aluminium fumarate and aluminium fumarate with 1 wt % binder (Batch I).

The PXRD pattern of aluminium fumarate and aluminium fumarate with 1 wt % of binder is presented in FIG. 7. Furthermore, a simulated pattern of aluminium fumarate is plotted. It can be seen that most of the peaks in the trace of the pristine MOF and the MOF with 1 wt % binder are a reasonable match to the simulated phase.

Figure 8:
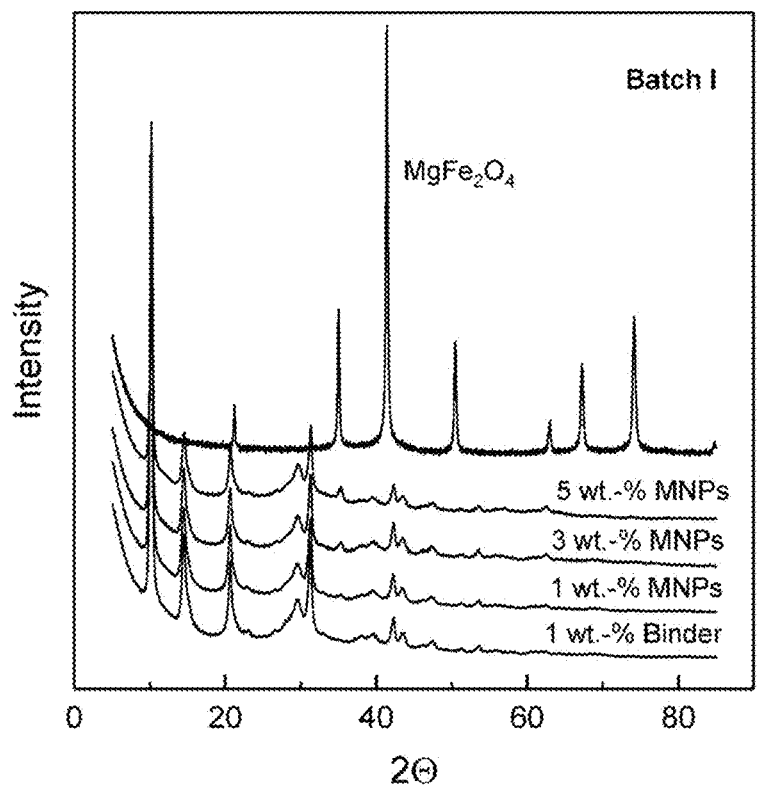
FIG. 8 provides a PXRD pattern of different aluminium fumarate magnetic composites, aluminium fumarate with 1 wt % binder (Batch I) and magnesium ferrite as reference.

The PXRD pattern of different aluminium fumarate magnetic framework composites made from Batch I can be taken from FIG. 8. Furthermore, the trace of magnesium ferrite is plotted as reference.

The traces of all composites match the PXRD pattern of aluminium fumarate containing only the binder.

For the composite containing 1 wt % of magnetic nanoparticles, the PXRD pattern does not reveal a significant evidence of magnesium ferrite in the sample. Presumably, any magnetic nanoparticles present in this sample are below the detection limit.

The PXRD pattern of composites with 3 wt % and 5 wt % of magnesium ferrite look fairly similar with a trace of magnetic nanoparticles being visible at the $2\theta$ angle 35°.

Figure 9:
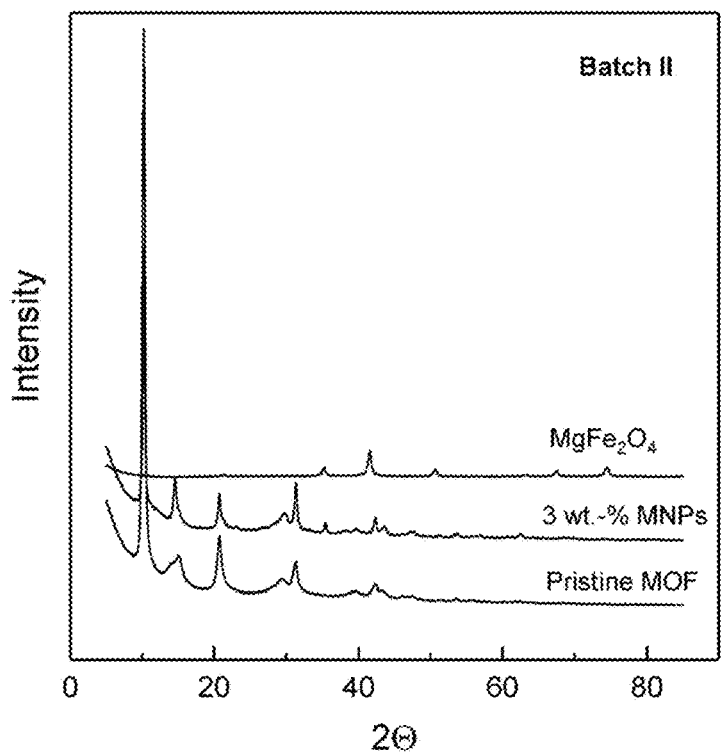
FIG. 9 provides a PXRD pattern of aluminium fumarate magnetic composite, aluminium fumarate (Batch II) and magnesium ferrite as reference.

The PXRD trace of the magnetic framework composite made from Batch II are presented in FIG. 9. The pattern matches the trace of the pristine MOF of this batch. Similar to the composites made from Batch I, there is a trace of magnesium ferrite visible at the $2\theta$ angle 35°.

Figure 10:
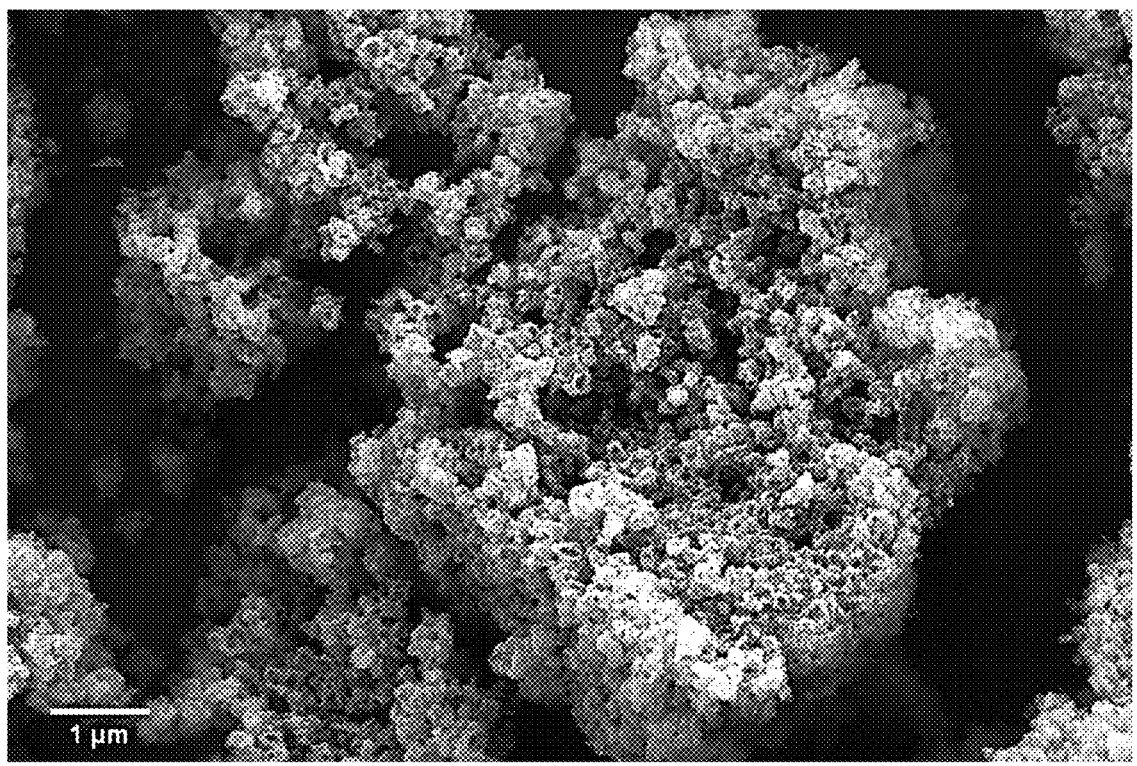
FIG. 10 provides a SEM image of aluminium fumarate metal organic framework (Batch II). Magnification: 10000 times.

The surface morphology of aluminium fumarate has been studied using scanning electron microscopy and is presented in FIG. 10. It can be observed from this Figure that this MOF has a quite rough surface and a poorly crystalline structure.

Figure 11:
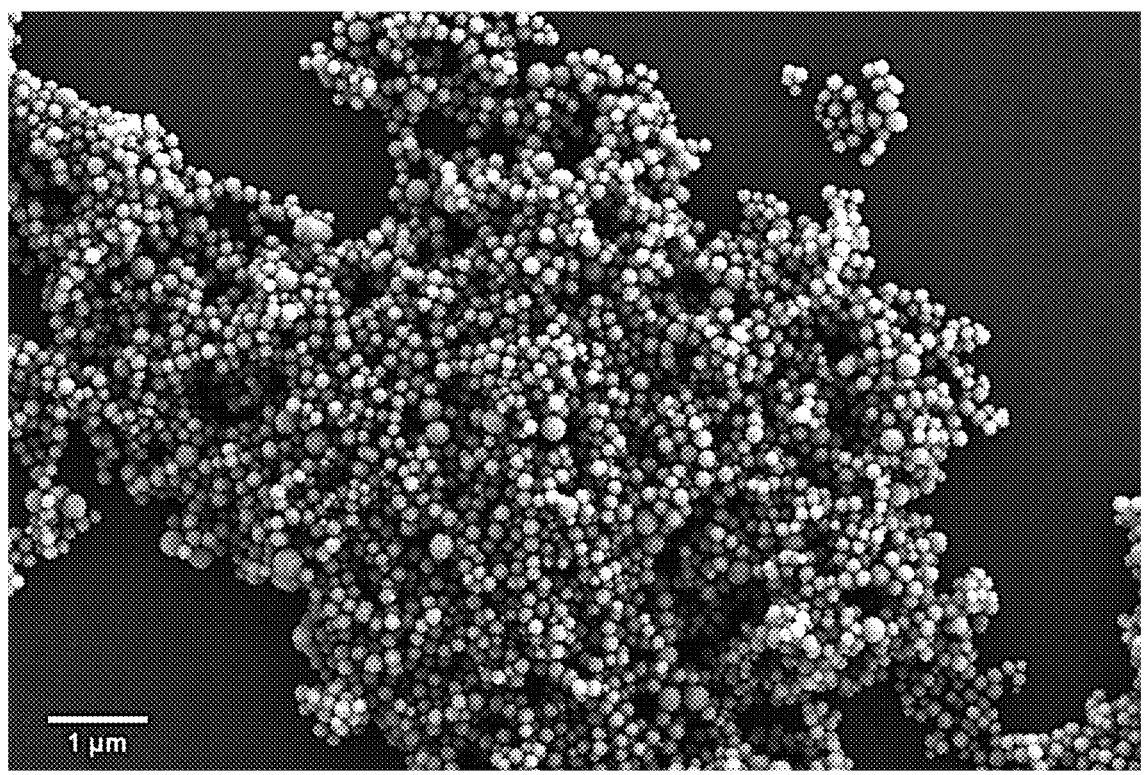
FIG. 11 provides a SEM image of magnesium ferrite nanoparticles. Magnification: 10.000 times.

The narrow particle size distribution of magnesium ferrite nanoparticles are presented in FIG. 11. The average particle size of this sample is about 150 nm.

Figure 12:
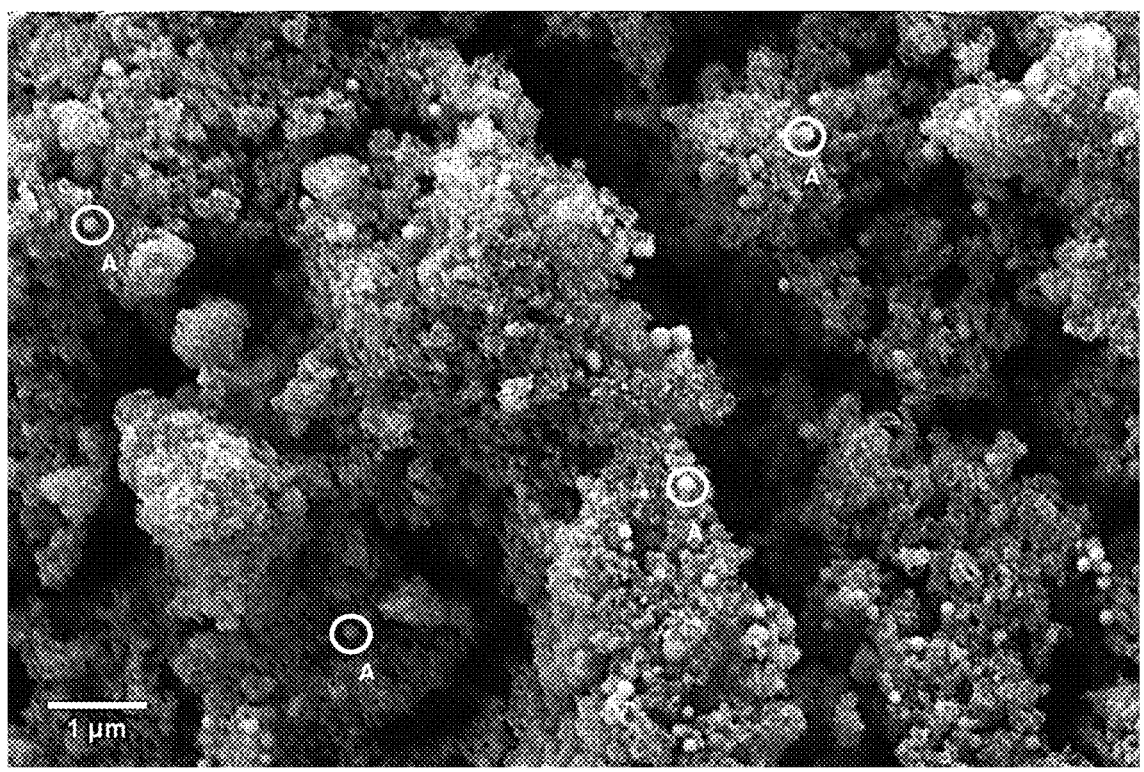
FIG. 12 provides a SEM image of aluminium fumarate magnetic framework composite (Batch II) at a magnification of 10000 times. The circled sections marked with A indicate the location of magnesium ferrite nanoparticles in the composite.

The incorporation of aluminium fumarate and magnesium ferrite nanoparticles can be observed from FIG. 12. The circled sections marked with A indicate examples of the location of magnesium ferrite nanoparticles in the composite. It can be seen, that the nanoparticles are fairly equally distributed within the MOF structure.

Figure 13:
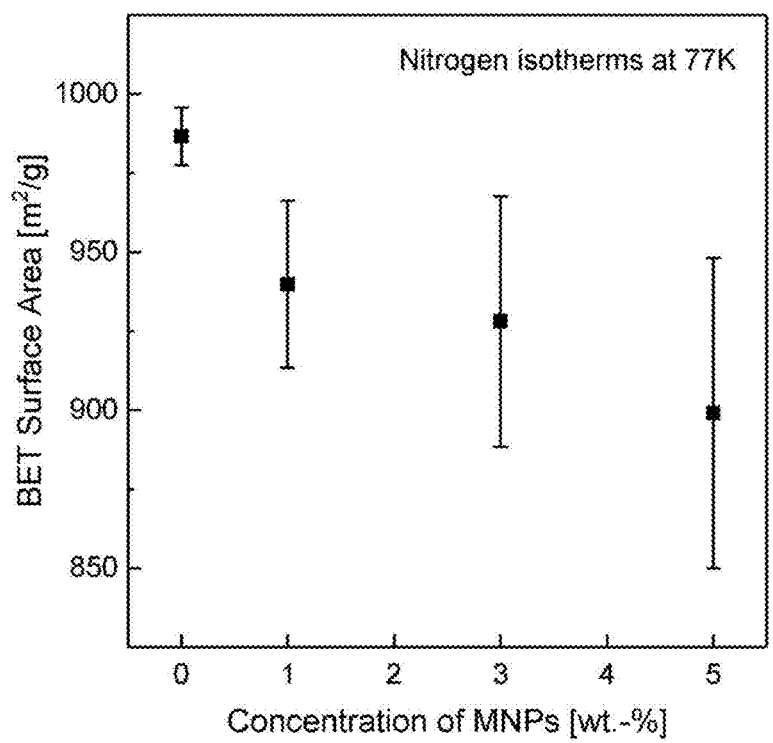
FIG. 13 provides an averaged BET surface area of aluminium fumarate composites as a function of magnetic nanoparticle loading.

The average BET surface area of aluminium fumarate magnetic framework composites as a function of magnetic nanoparticle loading is shown in FIG. 13. The sample containing no magnesium ferrite refers to composite pellets that were made only from the MOF and binder. The average surface area of pristine aluminium fumarate pellets is 976 $m^2/g$. The standard deviation of the measurements for this sample is 33 $m^2/g$.

From the plot and the surface area of the pristine MOF it can be taken, that there is not a significant change in the BET surface area for adding the binder and for an increasing magnetic nanoparticle concentration. Even though there is a slight decrease in surface area visible for higher nanoparticle loadings, the average surface area is still in the same order of magnitude. Furthermore, the standard deviation for the different experiments does not substantiate the decreasing trend.

The BET surface area of the second batch and composite pellets prepared from this batch is shown in Table 3. It can be seen that there is also not a significant difference in the surface area between the pristine MOF and its composite. However, the surface area of MOF pellets from batch II is lower that on pellets prepared from the first batch.

TABLE 3

BET surface area of aluminium fumarate batch II and aluminium fumarate batch II composite

| Sample | Concentration MNPs [wt %] | BET Surface Area [$m^2/g$] |
|---|---|---|
| Pristine MOF | 0 | 876 |
| Composite | 3 | 849 |

Figure 14:
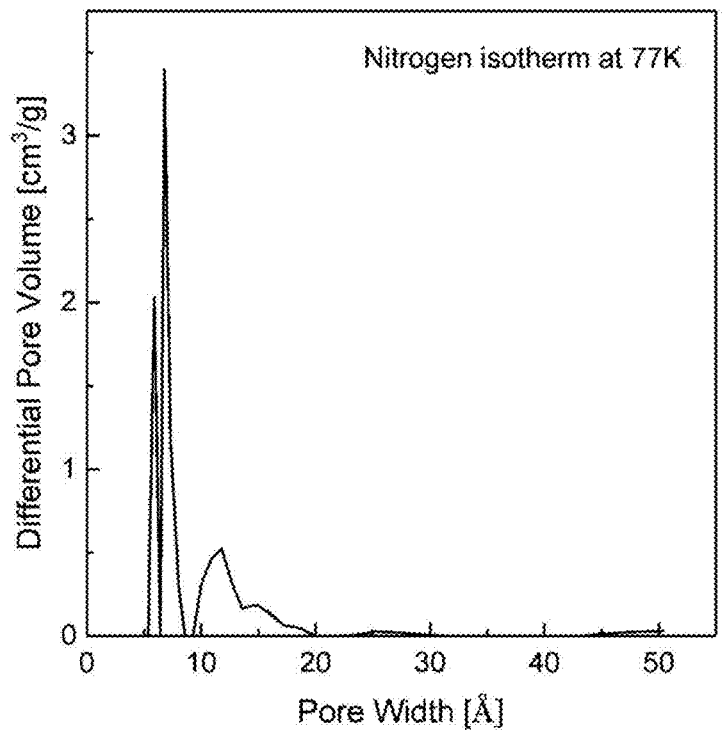
FIG. 14 provides a plot of the pore size distribution of aluminium fumarate MOF pellets (Batch I).
Figure 15:
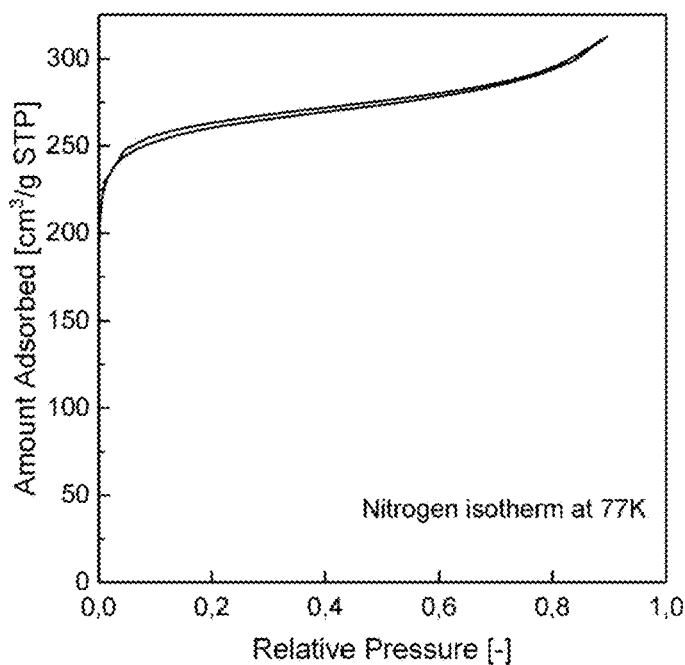
FIG. 15 provides a nitrogen isotherm of aluminium fumarate pellets.

The pore size distribution of aluminium fumarate pellets are presented in FIG. 14. The main pores size distribution is in the microporous area which is below 2 nm. The microporosity of this sample can also be confirmed with the nitrogen adsorption-desorption isotherm which is shown in FIG. 15. According to IUPAC classification of adsorption isotherms, the shape of this isotherm corresponds to a physisorption isotherm type H4. This shape is typical for microporous materials where the high uptake at low relative pressures is associated with the filling of micropores.

Figure 16:
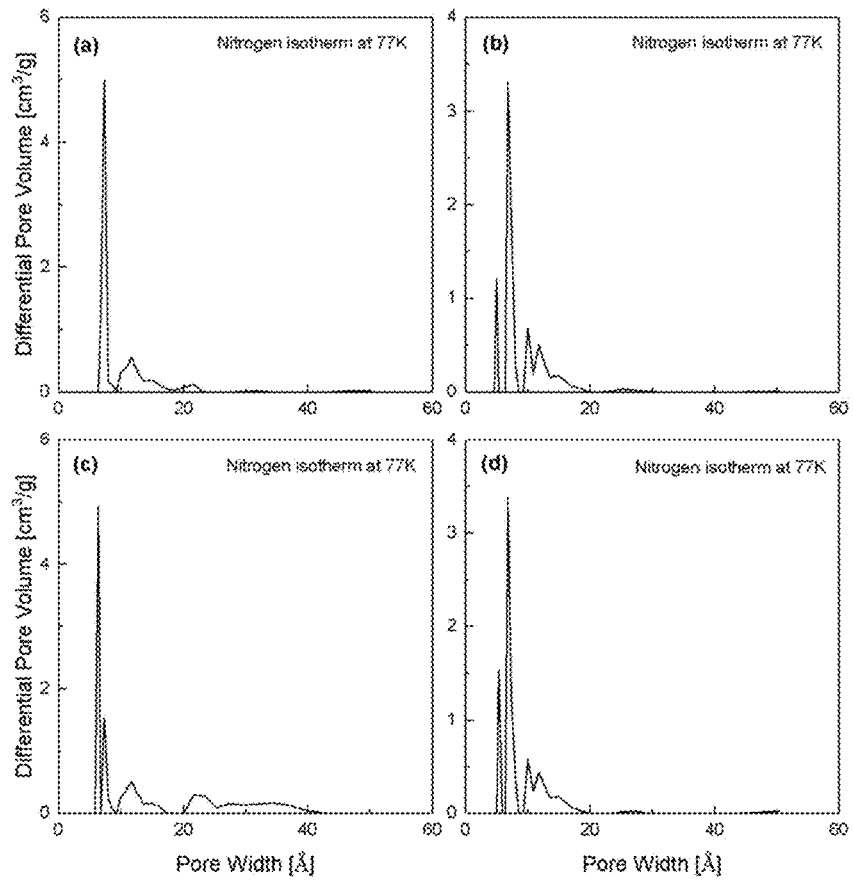
FIG. 16 provides a plot of the pore size distribution of aluminium fumarate composite pellets containing: (a) 1 wt % binder. (b) 1 wt % MNPs (c) 3 wt % MNPs (d) 5 wt % MNPs.

FIG. 16 illustrates that most of the pores of aluminium fumarate composite pellets are also present in the microporous are below 2 nm. Only for the sample containing 3 wt % of magnesium ferrite nanoparticles, there are pores in the mesoporous area between 2 nm and 50 nm.

2.2 Performance Analysis of Aluminium Fumarate Composites

In this subsection, water uptake results and magnetic induction heating performance of the prepared material are presented and discussed. Furthermore, the results of induction heating experiments are compared to a conventional heating method.

2.2.1 Water Uptake Performance

Figure 17:
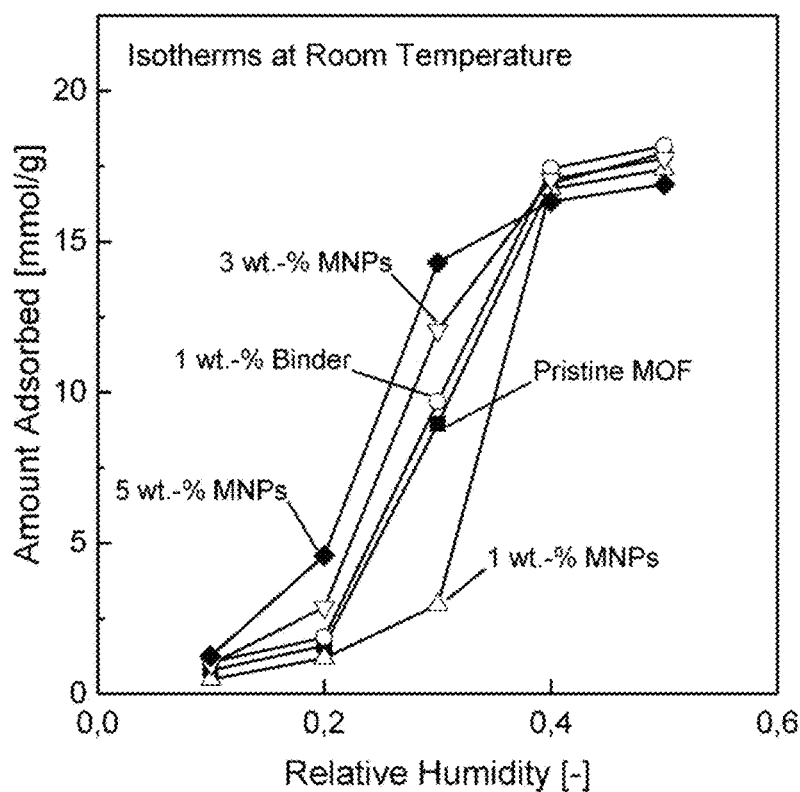
FIG. 17 provides water vapour adsorption isotherms for aluminium fumarate batch I and aluminium fumarate batch I composite pellets collected at room temperature.

The water vapour adsorption isotherms of samples prepared for pre studies on the effect of an increasing amount of nanoparticles in the MOF can be taken from FIG. 17. All isotherms were collected at room temperature. The plots show that there is not a significant difference between the moisture uptake capacities for the different composites. This was already shown with nitrogen isotherms in section 2.1. In order to check the accuracy of the measurements, the isotherm of the composite containing 5 wt % magnesium ferrite was collected two times. The Figure shows that the values of the second measurement vary by approx. 70% from the first measurement. Regarding this accuracy, it can be confirmed that moisture uptake of the composite pellets does not differ strongly from vapour uptake from pristine aluminium fumarate pellets.

Figure 18:
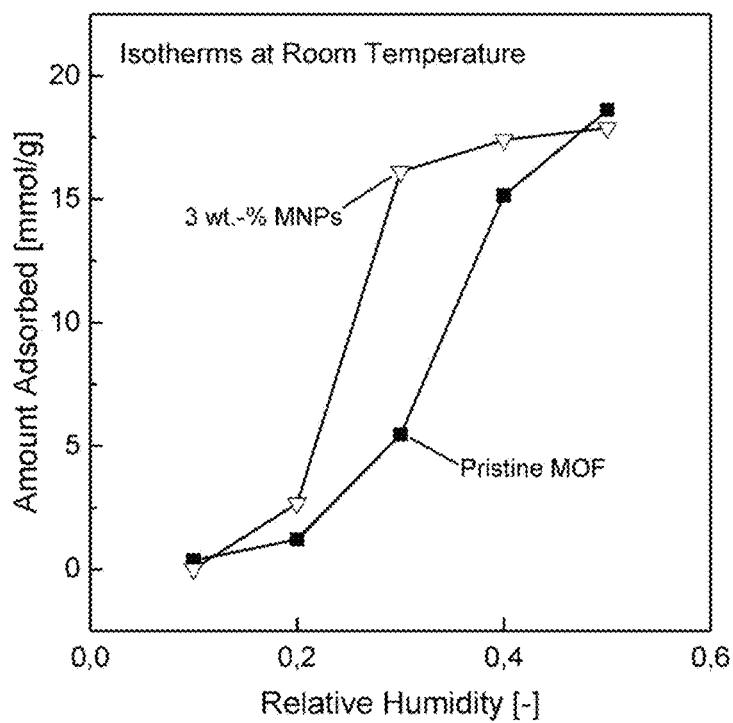
FIG. 18 provides water vapour adsorption isotherms of aluminium fumarate batch II and aluminium fumarate batch II composite pellets collected at room temperature.

The water vapour isotherms of aluminium fumarate and aluminium fumarate composite pellets prepared from the larger batch are presented in FIG. 18. Regarding the experimental variance of moisture adsorption experiments, it can be indicated that the water vapour uptake of the composite does not significantly differ to the one of the pristine MOF.

Figure 19:
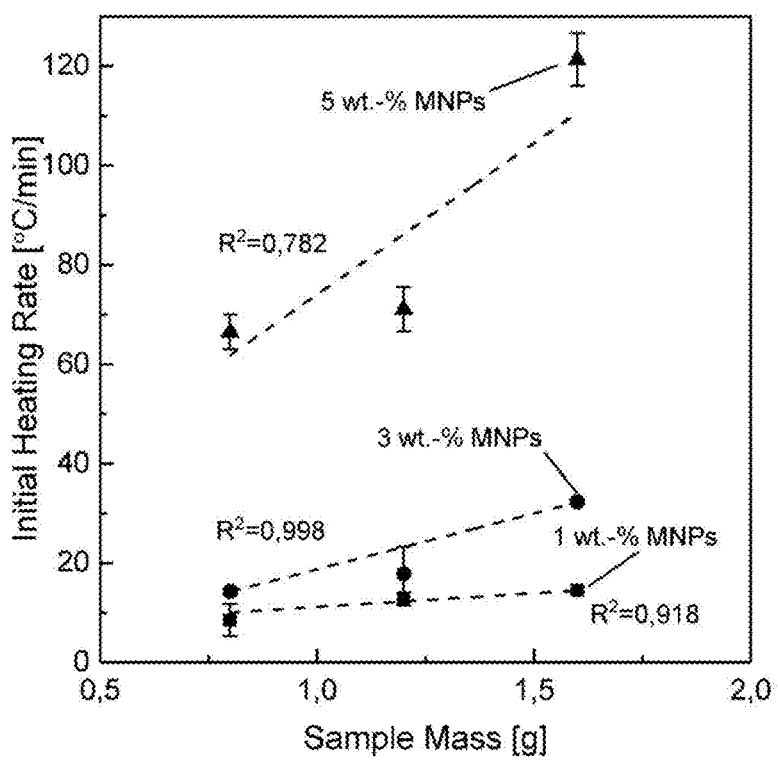
FIG. 19 provides a plot of the initial heating rate of induction heating of Aluminium Fumarate magnetic framework composites with different MNP concentrations. Field strength was 12.6 mT.

2.2.2 Induction Heating Performance and Comparison to a Conventional Heating Method The induction heating performance was evaluated, using the initial heating rate. The initial heating rate was determined as described in Section 1.2.6. Results of these experiments are shown in FIG. 19. The field strength in these experiments was 12.6 mT. It can be seen, that the initial heating rate increases with the concentration of magnetic nanoparticles incorporated into the metal organic framework. Furthermore, the heating rate increases fairly linear with the amount of sample that is triggered by the alternating current magnetic field.

Figure 20:
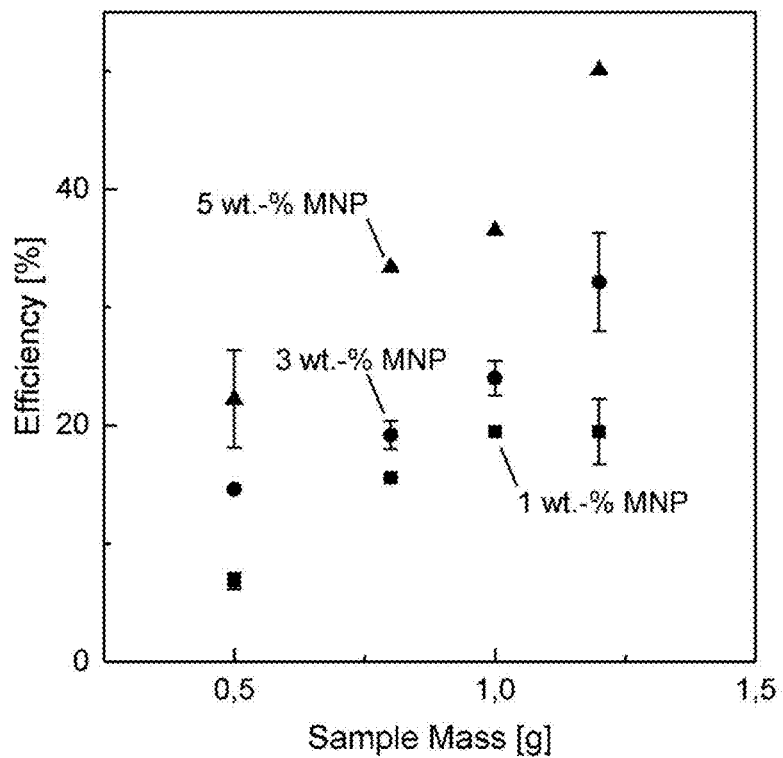
FIG. 20 provides a plot of the efficiency of induction heating of Aluminium Fumarate magnetic framework composites with different MNP loading. Field strength was 12.6 mT.

In addition to the initial heating rate, the energy conversion efficiency of induction heating of the prepared composites is shown in FIG. 20. The field strength was 12.6 mT. Similar to the initial heating rate, the efficiency also increases with an increase in magnetic nanoparticle loading and an increase in sample weight. The increase in efficiency with an increasing sample mass is counterintuitive as one would know from conventional heating methods. However, with an increasing amount of magnetic framework composite pellets, the amount of magnetic nanoparticles triggered by the magnetic field also increases. Therefore, the coupling between the nanoparticles is improved.

For applications on industrial scale, where much larger amounts of MFC pellets are used, the energy conversion efficiency is expected to be even higher than shown in this experiment. That is because of a loss of heat that is caused by non-existent insulation of the heated sample. The loss is not considered in the calculation of the SAR value. To minimize this heat loss, an adiabatic experimental set up needs to be used. However, the non-adiabatic system delivers quick and reliable SAR values without the need for extensive, time-consuming and expensive adiabatic measurements.

In addition to that, the efficiency could be further improved by utilizing induction heating systems that are not water cooled. Water cooled systems require separate support systems with pumps and connections that increase complexity and costs of the system. Induction heating systems that do not need direct cooling have been reported to achieve up to 90% energy efficiency.

2.3 Proof of Concept: Magnetic Induction Vacuum Swing Adsorption

Figure 21:
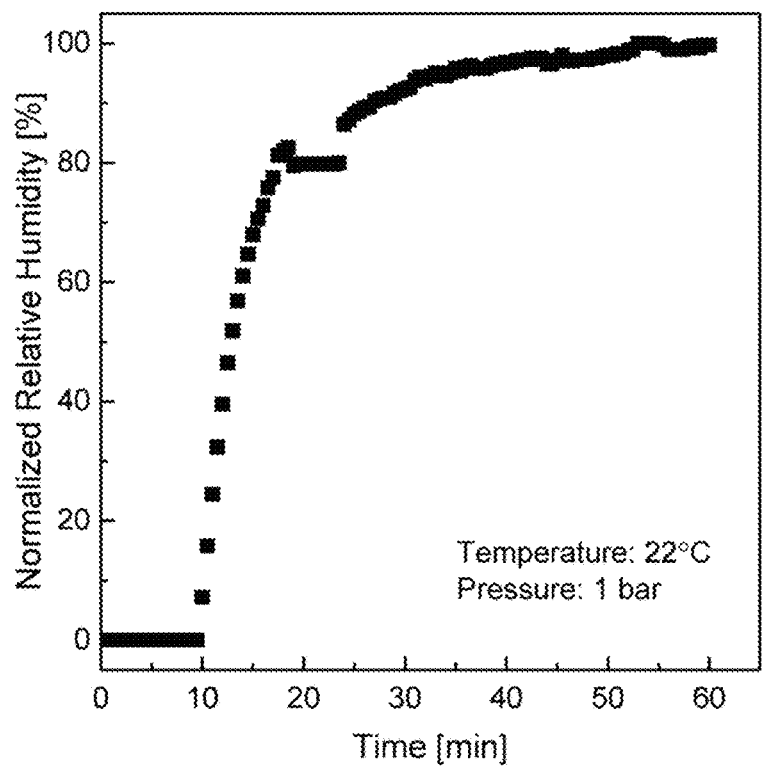
FIG. 21 provides a plot of the normalized relative humidity over time for adsorption of water vapour from a nitrogen stream.

The normalized humidity in the outlet stream of the column during adsorption of moisture is presented in FIG. 21. For this experiment, the relative humidity in the feed stream was set to 50% at a surrounding temperature of 22° C. This corresponds to the same moisture concentration that is present in the driest areas of the world. The volume flow rate for the moisturized and the dry nitrogen stream were both set to 4 SLPM. With these settings, the adsorption bed is fully saturated after approximately one hour. After about 17 minutes the humidity of the out coming stream stabilizes for approx. 8 minutes. This might be due to a sectional higher packing density along the column length which is caused by the inhomogeneity of the pellet length.

In order to reduce the cycle time, for further experiments the breakthrough point where adsorption is stopped was set to the time when 90% of the maximum outlet humidity is reached. This is after approx. 27 minutes.

Figure 22:
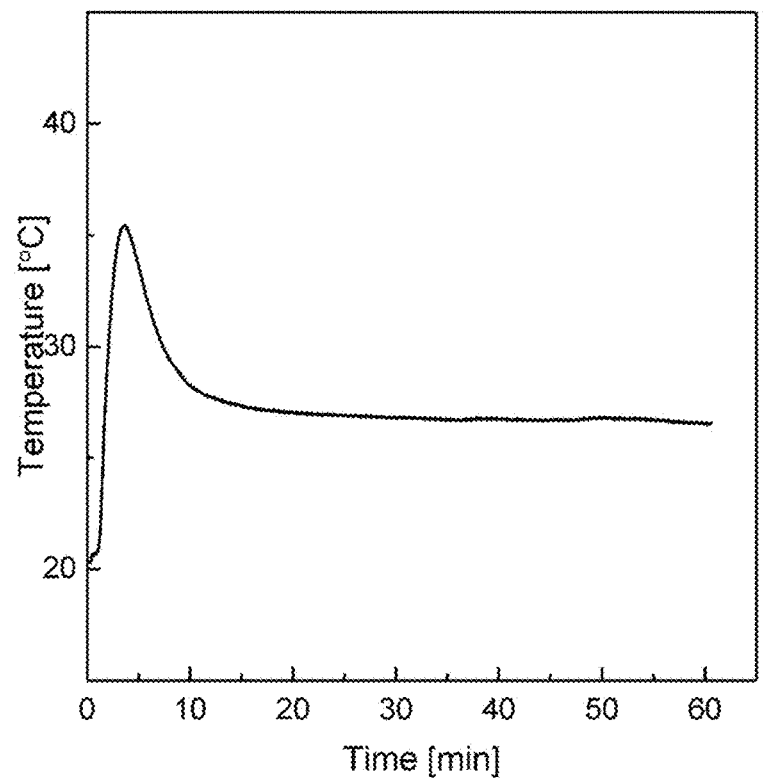
FIG. 22 provides a plot of the temperature profile of aluminium fumarate composites during adsorption of moisture.

The temperature that was measured during adsorption of water vapour is shown in FIG. 22. The temperature increases in the beginning due to the released heat of adsorption.

Figure 23:
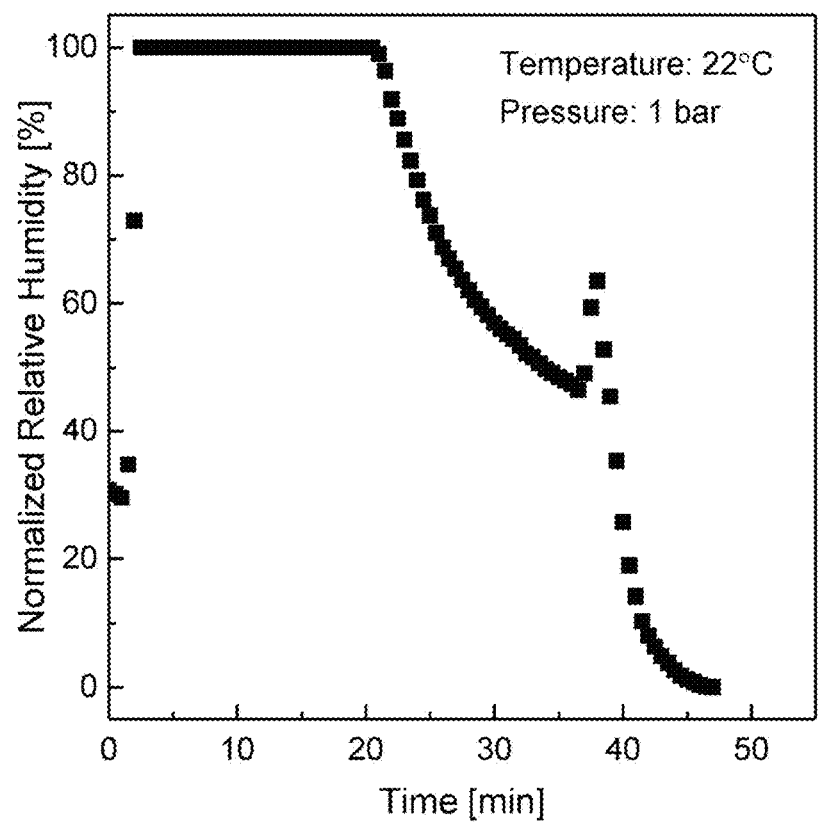
FIG. 23 provides a plot of the normalized relative humidity over time for the out coming stream during regeneration.

The normalized humidity during regeneration is shown in FIG. 23. Due to the height of the adsorption bed, the induction coil needed to be placed at two different positions in order to heat up the whole material. First, the coil was placed at the upper part of the column. After approx. 2 minutes, the humidity increases drastically due to the rapid heating rate of magnetic induced heating. Almost 20 minutes later, the humidity of the out coming stream decreases as the water amount captured in the MOF also decreases. Right before the humidity in the outlet stream settles, the coil was moved to the lower part. The water that is still adsorbed on the material in the lower part of the column is therefore released. The power of the induction coil was shut off when the humidity reached zero.

Figure 24:
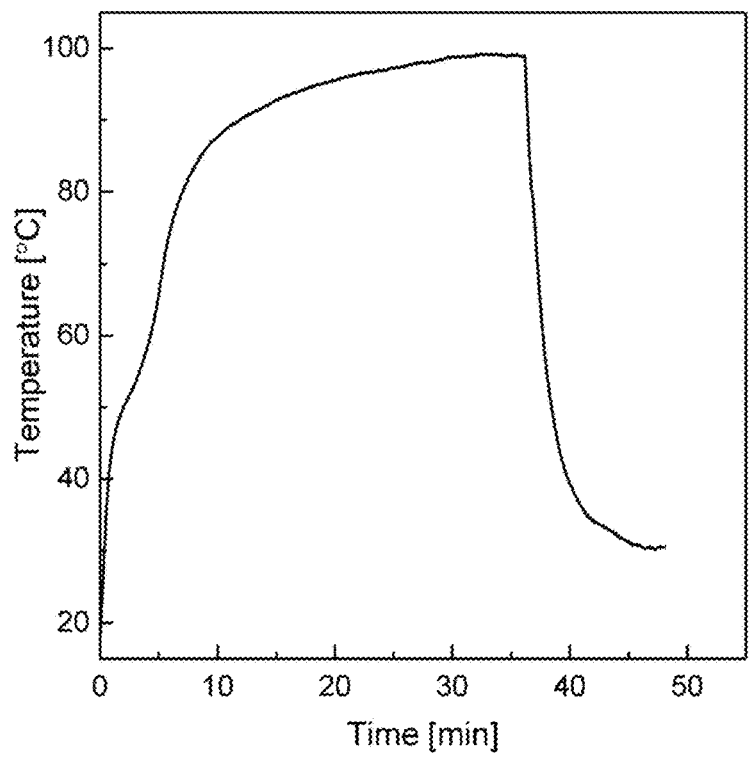
FIG. 24 provides a plot of the temperature profile of aluminium fumarate composites during regeneration of water vapour.

The temperature over time during regeneration of water vapour can be taken from FIG. 24. It can be seen from that Figure and the plot of the normalized humidity during regeneration that as soon as the temperature reaches about 50° C., water release starts. The temperature decreases as the coil was moved to the lower part of the column. That is because the temperature sensor sits above the middle of the adsorption bed.

Based on the adsorption isotherms for moisture and the pre studies on the behaviour of the column regarding water adsorption and regeneration, a theoretical yield for the rig can be calculated.

In order to evaluate the energy consumption and efficiency of a magnetic induction vacuum swing adsorption process, energy was measured during regeneration of the MOF composite. For these measurements the 1.2 kW induction heating system was chosen. The parameters for energy efficiency experiments can be taken from Table 4. The energy consumption was monitored using an energy data logger.

TABLE 4

Parameter energy consumption measurements

| Parameter | Value | Unit |
|---|---|---|
| Mass MFC pellet | 5 | g |
| Flow rate dry $N_2$ stream | 4 | SLPM |
| Flow rate wet $N_2$ stream | 4 | SLPM |
| Surrounding temperature | 22 | ° C. |
| Current induction heating system | 225.6 | A |
| Frequency induction heating system | 268 | kHz |

Before the actual experiment a breakthrough curve for the set up described in Table 4 was determined. Therefore, the activated MOF composite pellets were charged with water vapour for twenty minutes. After this time the adsorption bed was fully loaded with moisture. The breakthrough curve is presented in FIG. 21.

However, in order to increase the overall efficiency of the process, the breakthrough point where adsorption is stopped for the experiments was chosen to be when 90% of the maximum outlet humidity was reached.

After adsorption of water vapour, the regeneration was started and energy consumption of the induction heating system was monitored. Regeneration of the adsorption bed was performed for twenty minutes. This experiment was repeated three times. The results can be taken from Table 5. In this table, the cycle time is the total time for adsorption and regeneration. The capture efficiency is calculated as the ratio between the amount of moisture that is fed into the column and the amount of water that is captured by the absorbance. The calculated price per litre shows there are reasonable prices for water captured from air using this methodology.

TABLE 5

Results water capture experiments

| Cycle No | Cycle Time [min] | Yield [L kg$^{-1}$ day$^{-1}$] | Capture Efficiency [%] | Energy Consumption [kWh/L] | Energy Conversion Efficiency [%] | Price per Litre* [$/L] |
|---|---|---|---|---|---|---|
| 1 | 28 | 4.1 | 57.3 | 12.8 | 98.3 | 3.5 |
| 2 | 28 | 4.6 | 64.4 | 10.4 | 106.7 | 2.9 |
| 3 | 28 | 4.1 | 57.3 | 13.0 | 96.4 | 3.6 |

*Excluding capital costs

3. Water Analysis

An IPC analysis was conducted on a comparative Milli-Q water sample and a Milli-Q water sample mixed with water captured using the inventive method from cycle 1 (Table 5) in with a dilution ratio of 1:15 of inventive water to Milli-Q. Water collected from cycle 1 was analysed to test the water for its suitability as potable water. The sample was diluted with ultrapure water with a dilution rate of 1:15. The water sample was analysed for cations (Ca$^+$, K$^+$, Mg$^+$, Na$^+$, S$^+$) and metals (Al, As, B, Cd, Co, Cr, Cu, Fe, Mn, Mo, Ni, P, Pb, Sb, Se, Si, Sr, Zn) using inductively coupled plasma mass spectrometry. Additionally, ion chromatography was performed to analyse the water for anions (F$^-$, Cl$^-$, Br, NO$_3^-$, SO$_4^-$).

IPC analysis of both samples followed testing standards as follows:

Fluoride, bromide, sulfate [APHA method 4110]. These common anions are determined by ion chromatography using a Dionex ICS-2500 system with 2 mm AS19 anion separation column and potassium hydroxide eluent generated on line, followed by conductivity detection after chemical suppression. With a flow rate of 0.25 mL per minute the anions F$^-$, Cl$^-$, Br, NO$_3^-$ and SO$_4^{2-}$ are eluted between 3.5 and 25 minutes. Each ion concentration is calculated from peak areas using a 25 μL injection and compared to calibration graphs generated from a set of mixed standards with a range of concentrations.

Cations and metals [APHA method 3120]. A range of elements are determined by Inductively Coupled Plasma Optical Emission Spectroscopy (ICPOES). The sample is nebulised into the plasma of an Agilent 5100 ICPOES. The emission spectra of the elements of interest are measured simultaneously. This determines the major cations (Ca, K, Mg and Na) along with trace elements (Al, B, Cu, Fe, Mn, Sr and Zn) and the non-metallic elements P, S and Si.

The results of the IPC analysis are provided in Tables 6A and 6B.

TABLE 6A

Results of IPC Analysis of water samples - part 1

| | | Ion Chromatography | | | | | ICP Majors | | | |
|---|---|---|---|---|---|---|---|---|---|---|
| Sample # | $F^-$ mg/L | $Cl^-$ mg/L | $Br^-$ mg/L | $NO_3^-$ mg/L | $SO_4^-$ mg/L | Ca mg/L | K mg/L | Mg mg/L | Na mg/L | S mg/L |
| 1 Milli-Q Water | <0.05 | <0.05 | <0.05 | 1.6 | <0.05 | <0.1 | <0.2 | <0.1 | <0.2 | <0.2 |
| 2 Sample + Milli-Q Water | <0.05 | <0.05 | <0.05 | 4.1 | <0.05 | <0.1 | <0.2 | <0.1 | <0.2 | <0.2 |

TABLE 6B

Results of IPC Analysis of water samples - part 2
ICP Minors

| # | Al mg/L | As mg/L | B mg/L | Cd mg/L | Co mg/L | Cr mg/L | Cu mg/L | Fe mg/L | Mn mg/L | Mo mg/L | Ni mg/L | P mg/L | Pb mg/L | Sb mg/L | Se mg/L | Si mg/L | Sr mg/L | Zn mg/L |
|---|---|---|---|---|---|---|---|---|---|---|---|---|---|---|---|---|---|---|
| 1 | <0.05 | <0.05 | <0.05 | <0.05 | <0.05 | <0.05 | <0.05 | <0.1 | <0.05 | <0.05 | <0.05 | <0.2 | <0.05 | <0.1 | <0.05 | <0.2 | <0.05 | <0.05 |
| 2 | <0.05 | <0.05 | <0.05 | <0.05 | <0.05 | <0.05 | <0.05 | <0.1 | <0.05 | <0.05 | <0.05 | <0.2 | <0.05 | <0.1 | <0.05 | <0.2 | <0.05 | <0.05 |

The results indicate that sample water produced using the method and apparatus of the present invention have a similar content to Milli-Q water, i.e. ultrapure water as defined by a number of authorities such as ISO 3696. Thus, apart from nitrate concentrations ($NO_3^-$), the concentration of all compounds in each sample (reference and inventive cycle 1) is below the detection limit.

The only significant difference is the nitrate concentrations ($NO_3^-$), concentrations. The concentration of nitrate in the water sample collected from cycle 1 is about 60.8 mg/L. In the "Guidelines for drinking-water quality" the World Health Organisation (WHO) has restricted nitrate concentration in potable water to 50 mg/L. The concentration of nitrate in the control/reference ultrapure water sample is also elevated being 1.6 mg/L. The concentration of $NO_3^-$ in ultrapure water type I however should be lower than 0.2 mg/L according to ISO 3696. It is thought that the abnormal nitrate concentrations of both water samples may be the result of contamination either during sample preparation or during sample analysis.

Example 2—Binders

4. Comparative Example—Binders

The following provides a comparative example of the water adsorption properties of a water adsorption body/pellet formed using a hydrophobic binder. The inventors have surprisingly found that a hydrophilic binder must be used to impart optimal water adsorption properties to the shaped water adsorbent composite bodies. Non-hydrophilic binders such as hydrophobic binders deliriously affect the water adsorption properties of the shaped water adsorbent composite bodies compared to pellets formed using hydrophobic binders.

A study was conducted on the effect on adsorption properties of Aluminium Fumarate pellets using different binders in aluminium fumarate pellet preparation.

Pellets were prepared following the methodology set out in section 1.1.2. However, the binder composition was varied between two batches of pellets. A first batch of pellets was made using the first batch (batch I discussed above) of AlFu (designated Aluminium Fumarate (I)) and a cellulose siloxane binder, which is a hydrophobic binder. A second batch of pellets was made using the second batch (batch II discussed above) of AlFu (designated Aluminium Fumarate (II)) and a hydroxypropyl cellulose binder, which is a hydrophilic binder. The water uptake capacity of each batch of pellets was determined following the methodology herein outlined.

Figure 25:
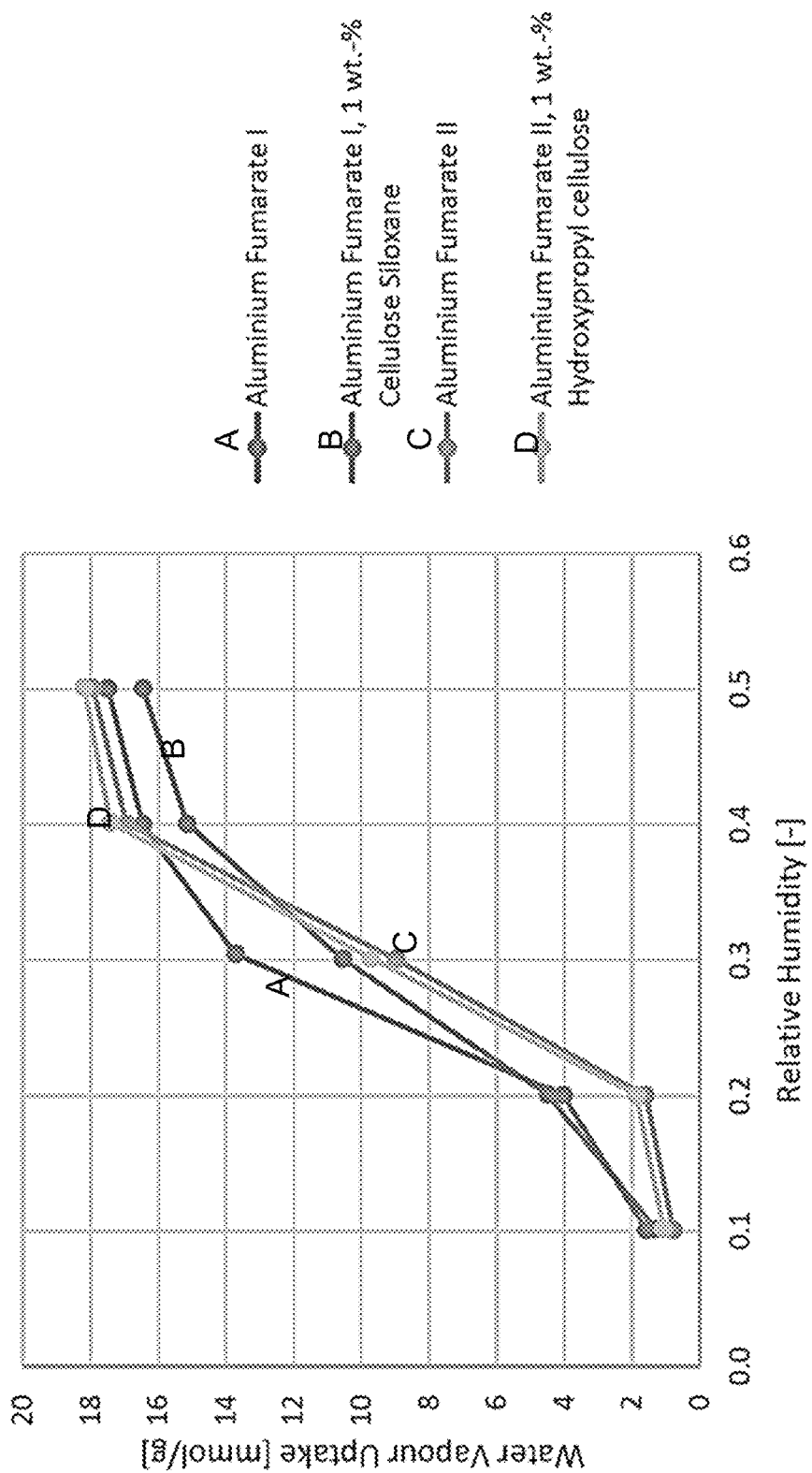
FIG. 25 provides a plot comparing the water vapour uptake isotherms of (A) a first batch of AlFu (Aluminium Fumarate (I)); (B) pellets comprising Aluminium Fumarate (I) and a cellulose siloxane binder; (C) a second batch of AlFu ((Aluminium Fumarate (II)); and (D) pellets comprising Aluminium Fumarate (II) and a hydroxypropyl cellulose binder.

The results of the water uptake capacity determination are provided in FIG. 25. A comparison of each batch to the Water Uptake Capacity isotherm for the comprising Aluminium Fumarate batch—i.e. Aluminium Fumarate (I) and Aluminium Fumarate (II) is also shown. It is noted that the adsorption isotherms between these batched differed due to differences in the properties of the formed Aluminium Fumarate MOF.

It is also noted from FIG. 25 that aluminium fumarate has a water capacity between 0.09 to 0.5 g of water per gram of MOF depending on the relative humidity. The typical heat of adsorption of aluminium fumarate for water is well known and ranges between 60 and 30 kJ/mol depending on the ambient humidity The water vapour uptake isotherms shown in FIG. 25 clearly indicate that using cellulose siloxane decreases the performance of the MOF. However, when using hydroxypropyl cellulose as a binder, there is no decrease win moisture uptake visible.

Comparison Between Devices

Table 7 below provides a comparison between the water harvesting device as developed in this work in accordance with embodiments of the present invention and to Yaghi's MOF based water harvesting devices as described in the background of the invention section. $STY_{device}$ is the space time yield with regard to the device's volume. $X_{min}$ provides a measure of the environmental conditions, i.e. the humidity (minimum water content) of the air fed over the MOF adsorbent.

TABLE 7

Comparison between the water harvesting devices developed in this work to other MOF based water harvesting devices.

| Device | Output (L/day) | Energy consumption (kWh/L) | $X_{min}$ (g m$^{-3}$) | STY device (L/m$^3$/d) | mass of MOF |
|---|---|---|---|---|---|
| Yaghi Prototype* | 0.078 | sunlight | 4.6 | 1.77 | 825 |
| Inventive Induction device (Example 1) | 0.23 | 10.4 | 9.7 | ~0.05 | 28 |

*F. Fathieh, M. J. Kalmutzki, E. A. Kapustin, P. J. Waller, J. Yang, and O. M. Yaghi. "Practical water production from desert air." In: Science Advances 4.6 (2018).

The comparison indicates that both the tested embodiment of induction water capture apparatus of the present invention have a better water output compared to the Yaghi devices.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

We claim:

1. An apparatus for capturing a water content from a water containing gas, the apparatus comprising:
    a housing having an inlet into which the water containing gas can flow;
    a water adsorbent enclosed within the housing, the water adsorbent comprising at least one water adsorbent metal organic framework composite capable of adsorbing a water content from the water containing gas, the metal organic framework composite comprising: at least 50 wt % water adsorbent metal organic framework; from 0.2 to 10 wt % magnetic particles having a mean particle diameter of less than 200 nm; and at least 0.1 wt % hydrophilic binder comprising a hydrophilic cellulose derivative; and
    a water desorption arrangement in contact with and/or surrounding the water adsorbent, the water desorption arrangement being selectively operable between (i) a deactivated state, and (ii) an activated state in which the arrangement is configured to apply heat to the water adsorbent to desorb a water content from the water adsorbent,
    wherein the water desorption arrangement comprises an alternating current (AC) magnetic field generator located within and/or around the water adsorbent configured to apply an AC magnetic field to the water adsorbent.

2. The apparatus according to claim 1, wherein the hydrophilic binder comprises an alkyl cellulose, hydroxyalkyl cellulose, or carboxyalkyl cellulose derivative.

3. The apparatus according to claim 1, wherein the hydrophilic binder is selected from at least one of hydroxypropyl cellulose (HPC), hydroxypropyl cellulose, hydroxyethyl methyl cellulose, hydroxypropyl methyl cellulose (HPMC), ethyl hydroxyethyl cellulose, methyl cellulose, or carboxymethyl cellulose (CMC).

4. The apparatus according to claim 1, wherein the alternating current magnetic field generator comprises at least one induction coil located within and/or around a packed bed of shaped water adsorbent composite bodies.

5. The apparatus according to claim 1, wherein the magnetic particles comprises a metal chalcogenide comprising a compound, ionic, or elemental form of that compound including a metal M selected from Li, Na, K, Rb, Be, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, Si, Ge, Sn, Pb, As, Sb, Bi, combined with an element C selected from at least one of O, S, Se, Te.

6. The apparatus according to claim 5, wherein the magnetic particles comprise at least one of $MgFe_2O_4$, $Fe_3O_4$, C-coated Co, $CoFe_2O_4$, $NiFe_2O_4$, Pyridine-2,6-diamine-functionalized $SiO_2$, or Pyridine-2,6-diamine-functionalized $Fe_3O_4$.

7. The apparatus according to claim 1, comprising between 0.5 and 7 wt % magnetic particles.

8. The apparatus of claim 1, wherein the metal organic framework composite comprises shaped water adsorbent composite body having at least one mean dimension of greater than 0.5 mm.

9. The apparatus of claim 8, wherein the shaped water adsorbent composite body comprises an elongate body having a circular, or regular polygonal cross-sectional shape.

10. The apparatus according to claim 1, wherein the water adsorbent metal organic framework comprises at least one of aluminium fumarate, MOF-801, MOF-841, $M_2Cl_2BTDD$, $Co_2Cl_2BTDD$, Cr-soc-MOF-1, MIL-101(Cr), CAU-10, alkali metal ($Li^+$, $Na^+$) doped MIL-101(Cr), MOF-303, MOF-573, MOF-802, MOF-805, MOF-806, MOF-808, and MOF-812.

11. The apparatus according to claim 1, wherein the water adsorbent metal organic framework includes a metal ion and a plurality of multidentate ligands of which at least one ligand is selected from fumarate or 3,5-pyrazoledicarboxylic acid (H3PDC) based ligands.

12. The apparatus according to claim 11, wherein the metal ion is selected from $Fe^{3+}$, $Li^+$, $Na^+$, $Ca^{2+}$, $Zn^{2+}$, $Zr^{4+}$, $Al^{3+}$, $K^+$, $Mg^{2+}$, $Ti^{4+}$, $Cu^{2+}$, $Mn^{2+}$ to $Mn^{7+}$, $Ag^+$, or a combination thereof.

13. The apparatus according to claim 1, comprising between 0.2 and 5 wt % hydrophilic binder.

14. The apparatus according to claim 1, wherein the water adsorbent metal organic framework has a mean particle size of between 20 and 100 μm.

15. The apparatus according to claim 1, further comprising less than 0.5 wt % lubricant.

16. The apparatus according to claim 1, wherein the water adsorbent comprises shaped water adsorbent composite bodies located in a packed bed in the housing packed at a density from 0.10 to 1.0 kg/L.

17. The apparatus according to claim 1, wherein the water containing gas comprises ambient air, wherein the relative humidity of the ambient air is between 25 to 100% at 22° C.

18. A method of capturing a water content from a water containing gas, comprising at least one cycle of:
    feeding a water containing gas through the inlet of a housing and over a water adsorbent enclosed within the housing such that the water adsorbent adsorbs water from the water containing gas, the water adsorbent comprising at least one water adsorbent metal organic framework composite capable of adsorbing a water content from the water containing gas, the metal organic framework composite comprising: at least 50 wt % water adsorbent metal organic framework; from 0.2 to 10 wt % magnetic particles having a mean particle diameter of less than 200 nm; and at least 0.1 wt % hydrophilic binder comprising a hydrophilic cellulose derivative, operating at least one water desorption arrangement to change from an inactive state to an activated state to apply an alternating current magnetic field to a packed bed of shaped water adsorbent composite bodies, thereby generating heat within the shaped water adsorbent composite bodies, so to release at least a portion of the adsorbed water therefrom into a product fluid flow, and directing the product fluid flow to a condenser system to separate a water content from the product fluid flow, wherein the water desorption arrangement is in contact with and/or surrounding the water adsorbent.

19. The method according to claim 18, wherein the method has a cycle time of less than 2 hours.

20. The method according to claim 18, wherein the alternating current magnetic field is applied when the packed bed has adsorbed moisture equivalent to at least 75% of the saturation point of the packed bed.

* * * * *